(12) United States Patent
Hamaguchi et al.

(10) Patent No.: US 7,571,952 B1
(45) Date of Patent: Aug. 11, 2009

(54) PROTECTION SCREEN AND TRUCK EQUIPPED WITH IT

(75) Inventors: Kazumichi Hamaguchi, Saitama (JP); Naoto Ono, Saitama (JP); Satoshi Fukuda, Saitama (JP); Shunji Kuroki, Osaka (JP)

(73) Assignee: Honda Access Corp., Saitama (JP)

( * ) Notice: Subject to any disclaimer, the term of this patent is extended or adjusted under 35 U.S.C. 154(b) by 0 days.

(21) Appl. No.: 12/042,161

(22) Filed: Mar. 4, 2008

(51) Int. Cl.
*B60J 7/00* (2006.01)

(52) U.S. Cl. .................. 296/183.2; 280/748; 410/1 A

(58) Field of Classification Search .............. 296/3, 296/183.02, 190.08; 280/748; 410/1 A
See application file for complete search history.

(56) References Cited

U.S. PATENT DOCUMENTS 3,765,713 A * 10/1973 Suitt ........................... 296/3

FOREIGN PATENT DOCUMENTS

JP 2006-96181 4/2006

* cited by examiner

*Primary Examiner*—Joseph D Pape
(74) *Attorney, Agent, or Firm*—Arent Fox LLP

(57) ABSTRACT

A protection screen is placed between a cabin and a loading platform and mounted to a vehicle body. The loading platform is placed adjacent to a back surface of the cabin and joined at a rear portion thereof to the vehicle body via a pivot axis so as to be inclined from a horizontal normal position to a dump position where the loading platform is inclined upward to a front. The protection screen includes an upper screen having a width wider than that of seat backs of occupant seats provided in the cabin; a lower screen continuously connected to a lower end of the upper screen and having a width narrower than that of the upper screen; and a bracket connecting the upper and lower screens together.

8 Claims, 30 Drawing Sheets

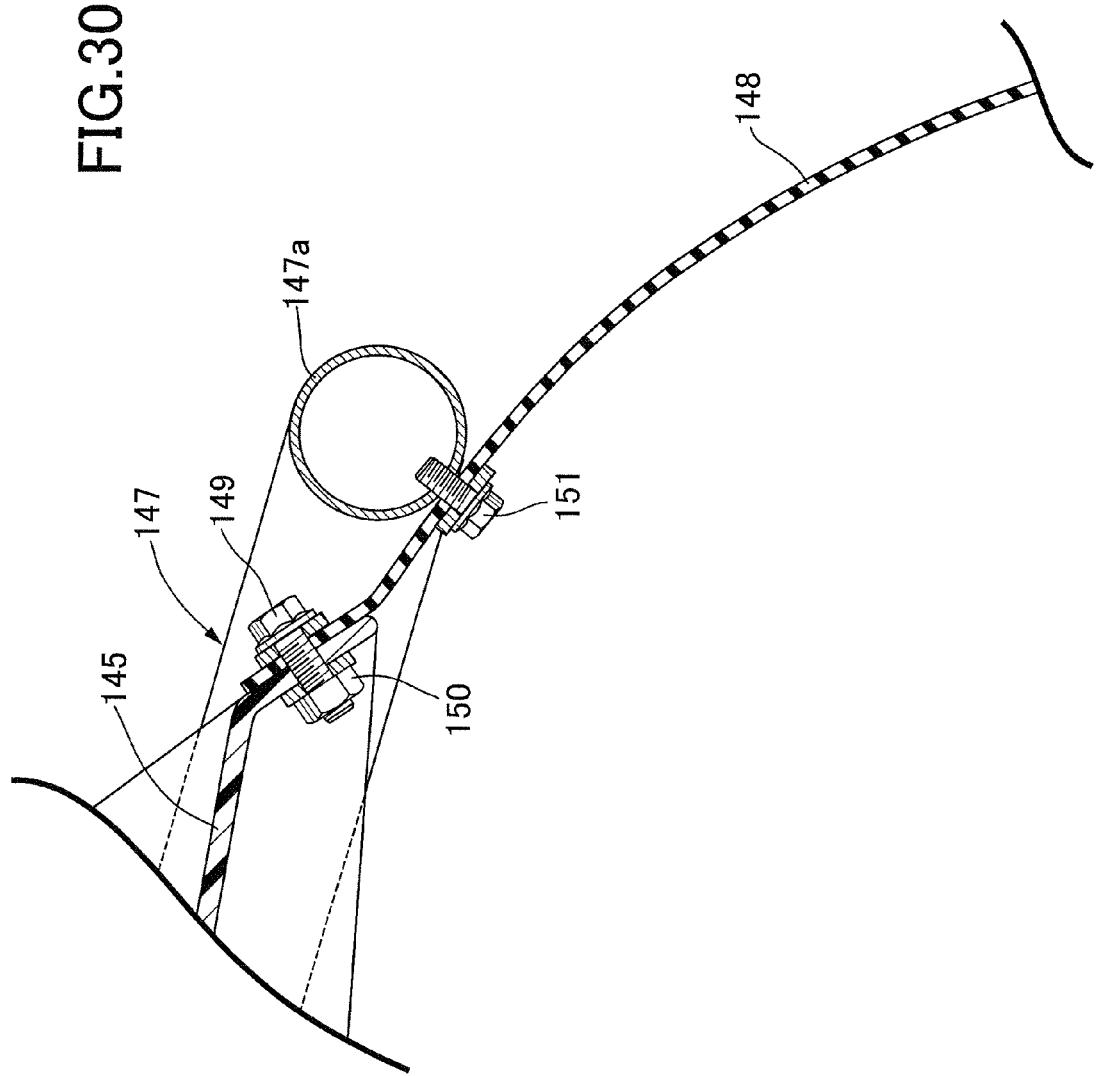

PROTECTION SCREEN AND TRUCK EQUIPPED WITH IT

BACKGROUND OF THE INVENTION

1. Field of the Invention

The present invention relates to a protection screen which is placed between a cabin and a loading platform and prevents luggage from moving from the loading platform to the cabin and a truck which comprises such a screen.

2. Description of the Related Art

Japanese Laid Open Patent Gazette Number 2006-96181 discloses a truck having a loading platform. The loading platform is placed behind and adjacent to a cabin and is mounted to a vehicle body so as to be tilted from a horizontal normal position to a dump position where the loading platform is tilted upward at a front thereof. A pair of grips, which are used for a manual dump operation of the loading platform, are provided at upper left and right corners in a front wall of the loading platform. U.S. Pat. No. 4,732,470 discloses a protection screen that covers a rear face of a cabin and prevents luggage from moving from a loading platform to a cabin.

In case a manual dump operation is performed to tilt the loading platform, a sufficient distance between the pivot axis of the loading platform and the grip, as mentioned above, allows a lighter or easier dump operation to be performed.

However, in the case where the protection screen is mounted to the cabin, interference between a grip and the protection screen needs to be avoided during such a dump operation.

SUMMARY OF THE INVENTION

In view of such circumstances, a purpose of this invention is to provide a protection screen that does not interfere with a grip of a loading platform during a dump operation of a loading platform, and that also prevents luggage from moving from the loading platform to a cabin, and a truck equipped with the protection screen.

The protection screen which achieves the purpose of the invention comprises an upper screen having a width wider than that of seat backs of occupant seats provided in the cabin; a lower screen having a width narrower than that of the upper screen; and a bracket which joins the upper and lower screens to the cabin. The upper and lower screens are joined into a unitary or single member. Therefore, a space is provided in the left and right ends of the lower screen below left and right end portions of the upper screen.

Thus, the space is defined in a location corresponding to a grip of a loading platform, and thus the grip and also a user's hand gripping the grip, can easily pass through the space when the user grips the grip in order to tilt the loading platform. Put simply, a grip and a hand gripping the grip can easily avoid interference with the protection screen of this invention.

It is preferable that the lower screen of the inventive protection screen may be placed to be inclined forward at a lower portion along sloping back surfaces of the seat back.

Therefore, a sufficient distance between a front wall of the loading platform and the lower screen can be ensured while an effective volume of the cabin is increased.

It is also preferable that the upper screen includes a mesh member and the lower screen includes a plate member.

Therefore, a rear field of view from the cabin can be ensured while reliably preventing the luggage from moving from the loading platform to the cabin. Also, because wind from outside to inside of the cabin flows through the mesh member without creating wind turbulence in the cabin, driver comfortability during driving is achieved.

Further, because the upper and lower screens are independently formed, the space can easily be formed without requiring a special cutting process.

The truck which achieves the purpose of the invention comprises a cabin, a loading platform and the above described protection screen. As such, the loading platform is joined to the truck body with a pivot axis so as to be inclined from a horizontal normal position to a dump position where the loading platform is inclined upward on a side of the cabin. Also, the invention makes a manual dump operation of the loading platform easier since the protection screen is joined to the cabin. A cut-out space that avoids a trail of the grip of the loading platform in the dump operation is provided in the location corresponding to the grip.

The protection screen mounted to the vehicle body reliably prevents the luggage from moving from the loading platform to the cabin. Further, the cut-out space that does not interfere with the trail of the grip of the loading platform in the dump operation of the loading platform is provided between the upper and lower screens that comprise the protection screen. Thus, the grip and a user's hand gripping the grip can easily pass through the space when the user grips the grip in order to tilt the loading platform. Put simply, a grip and a hand gripping the grip can easily avoid interference with the protection screen of this invention.

The foregoing and other objects, features and advantages of the present invention will become apparent from the following description of a preferred embodiment with reference to the drawings.

BRIEF DESCRIPTION OF THE DRAWINGS

FIG. 30 is an enlarged sectional view taken along the line 30-30 in FIG. 29.

DESCRIPTION OF THE PREFERRED EMBODIMENT

Now, preferred embodiments of the present invention will be described with reference to the accompanying drawings.

Figure 1:
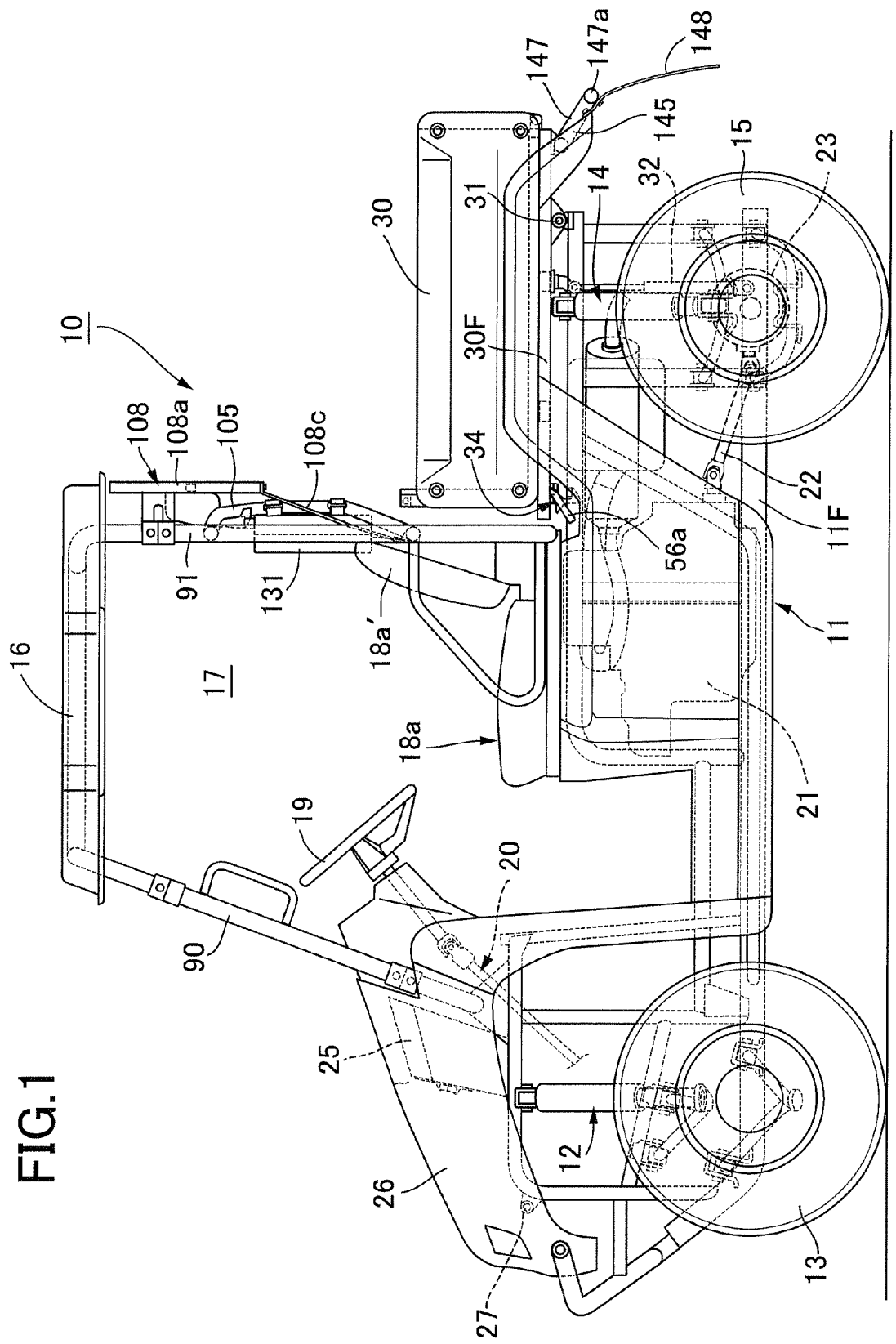
FIG. 1 is a side view of a truck according to an embodiment of the present invention.
Figure 2:
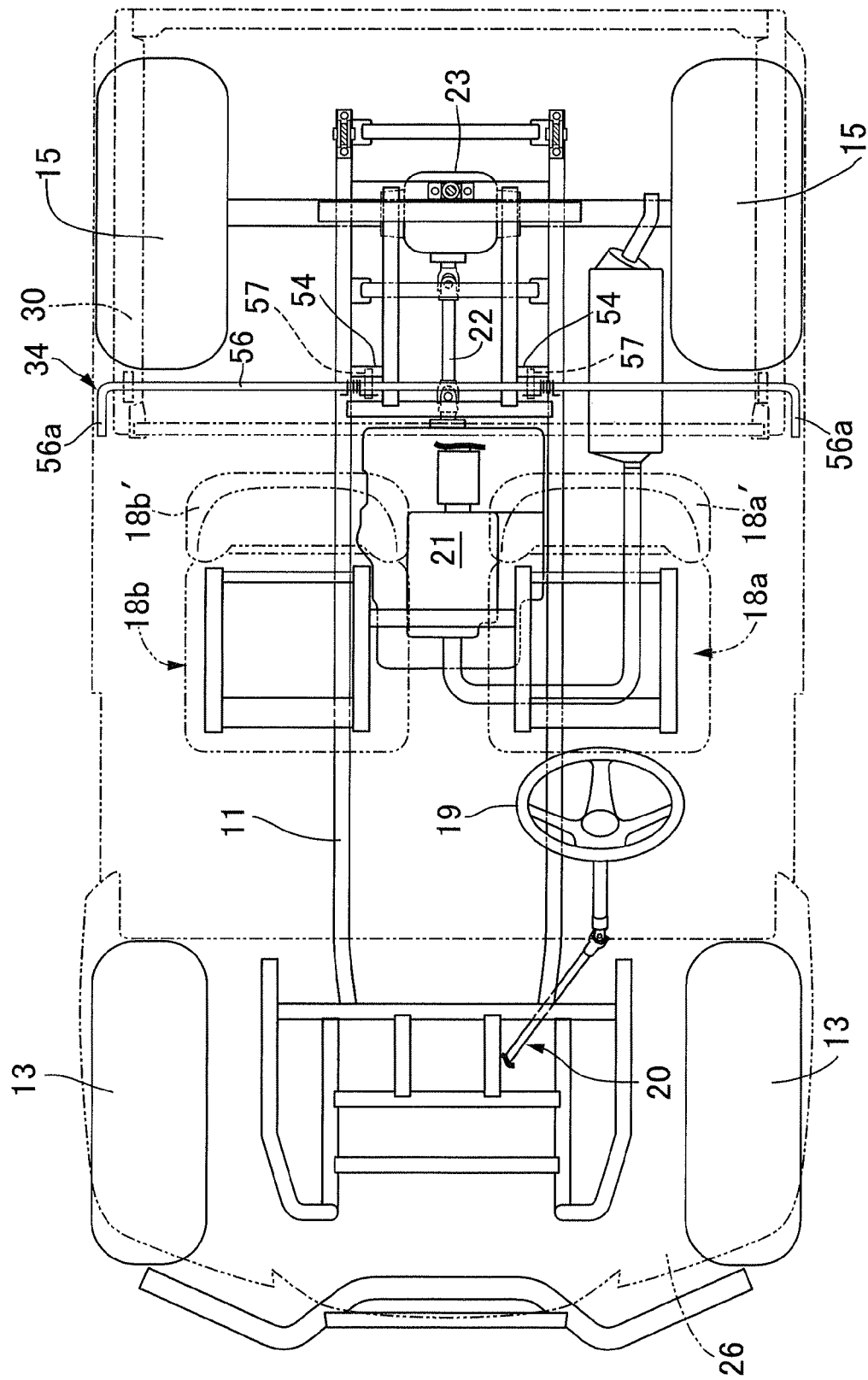
FIG. 2 is a plan view of the truck in FIG. 1 with essential portions of a vehicle body removed.

In FIGS. 1 and 2, reference numeral 10 denotes a multipurpose truck. The truck 10 includes a pair of left and right front wheels 13 and 13 suspended in a front portion of a vehicle body 11 by a front suspension 12, and a pair of left and right rear wheels 15 suspended in a rear portion of the vehicle body 11 by a rear suspension 14. To each wheel, a low pressure type tire called a balloon tire is mounted. In a middle portion of the vehicle body 11, a cabin 17 with a roof 16 is formed.

In the cabin 17, a pair of left and right occupant seats 18a and 18b, and a steering wheel 19 facing one driver seat 18a are provided, and the steering wheel 19 is steerably joined to the front wheels 13 via a steering mechanism 20. Below the left and right seats 18a and 18b, a power unit 21 including an engine is mounted in a frame 11F of the vehicle body 11, and power of the power unit 21 is transmitted to the rear wheels 15 via a propeller shaft 22 and a differential gear 23.

Figure 3:
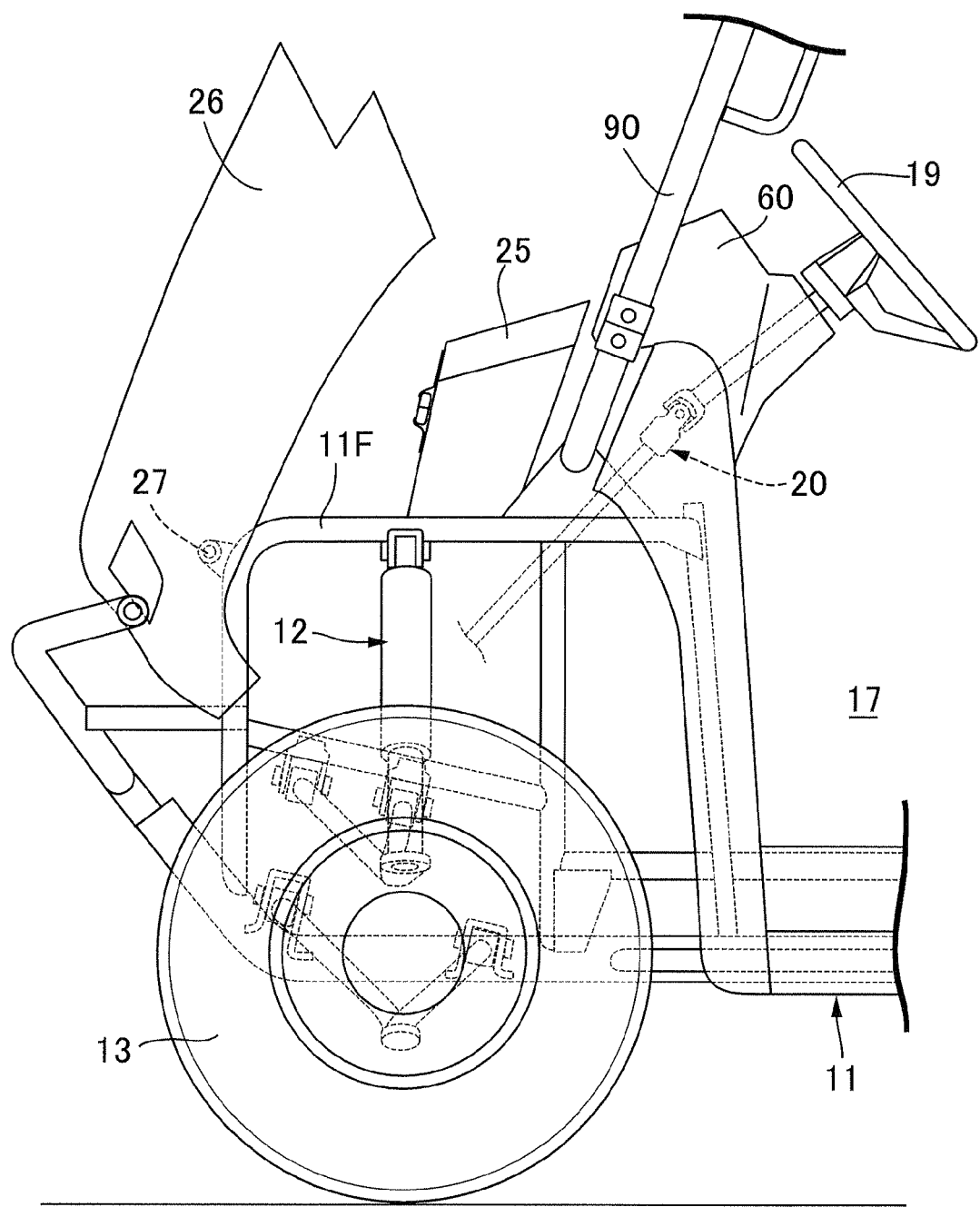
FIG. 3 is a side view of a front portion of the truck in FIG. 1 with a front hood opened.

As shown in FIGS. 1 and 3, in the front portion of the vehicle body 11, a housing box 25 is mounted that houses tools or other small articles placed in a space around the steering mechanism 20. A front hood 26 covering the housing box 25, the steering mechanism 20, and the front wheels 13 from above is openably and closably connected to the frame 11F of the vehicle body 11 via a pivot 27.

Figure 4:
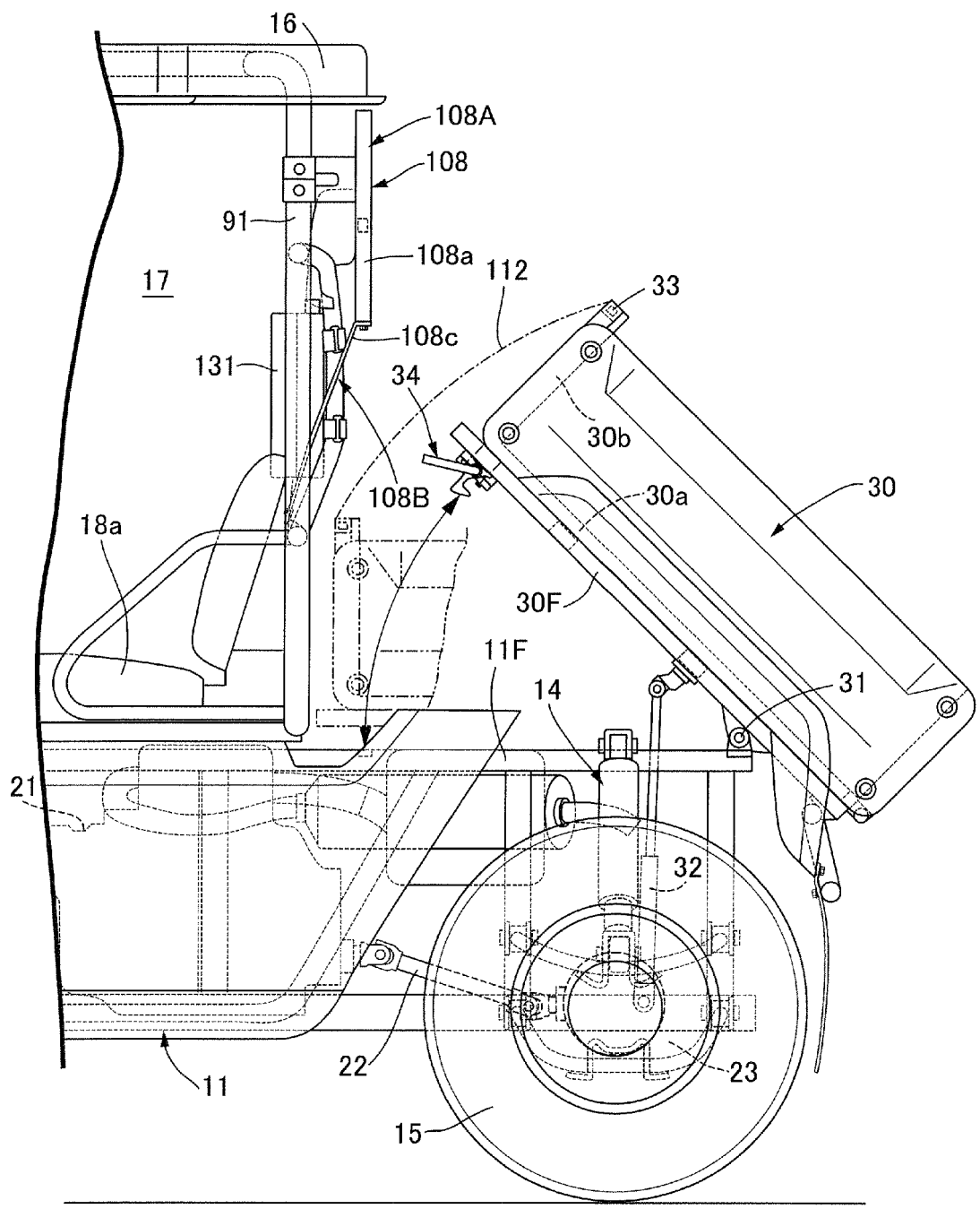
FIG. 4 is a side view of a rear portion of the truck in FIG. 1 in a dumping state of a loading platform.
Figure 5:
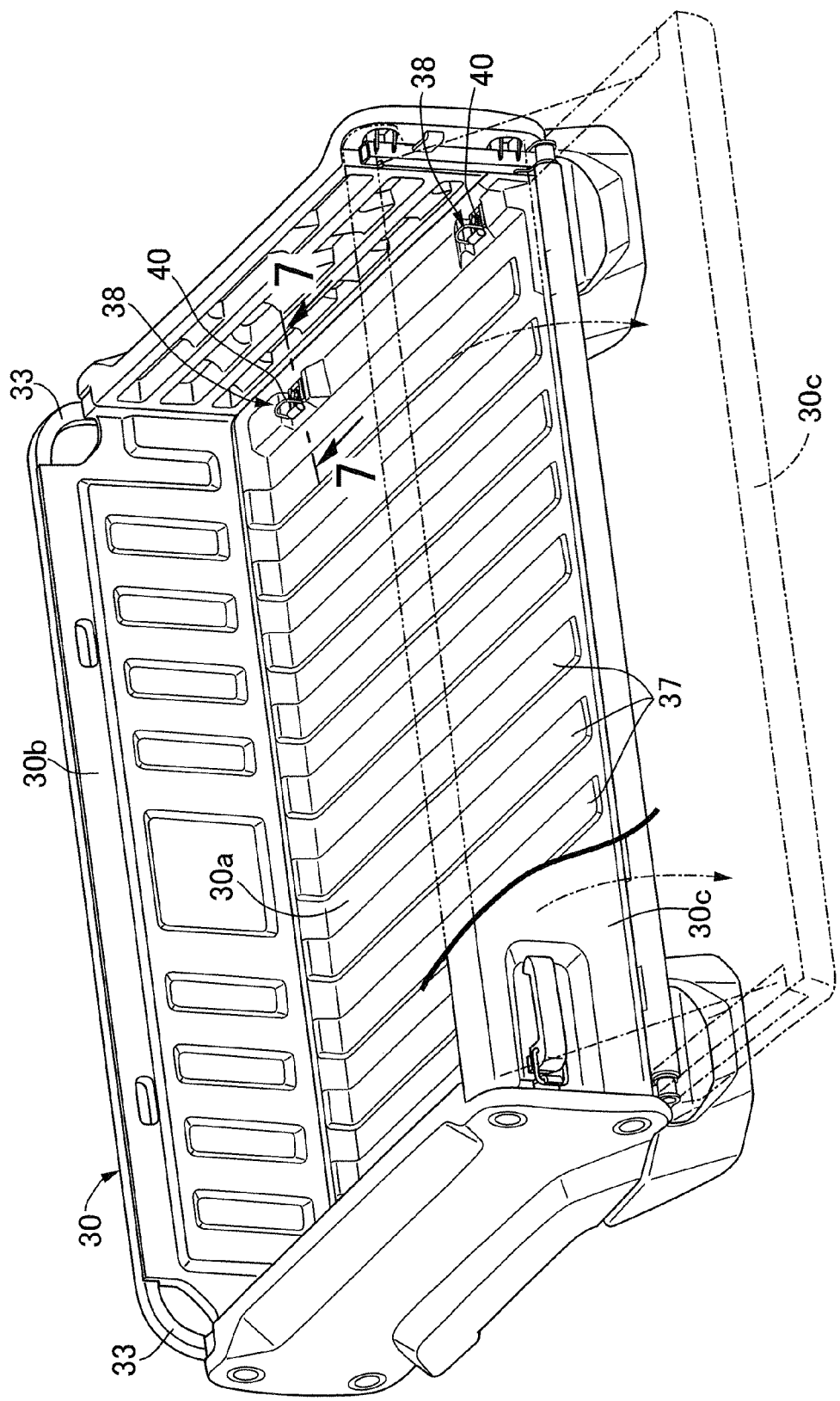
FIG. 5 is a rear perspective view of the loading platform.
Figure 6:
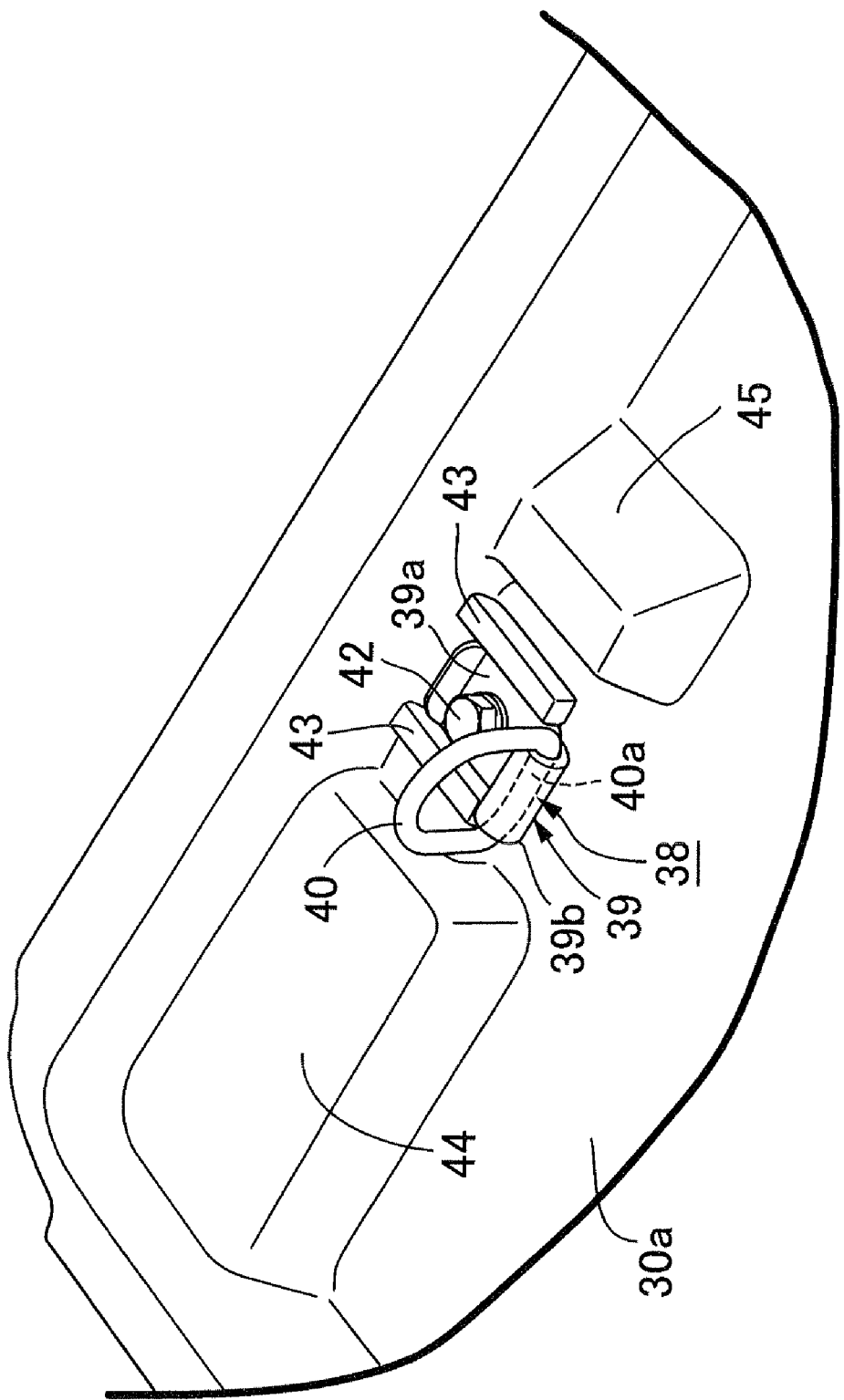
FIG. 6 is a perspective view of a load securing tool and its surroundings of the loading platform.

As shown in FIGS. 4 and 5, immediately above the rear wheels 15, a loading platform 30 is provided behind and adjacent to the cabin 17. The loading platform 30 is a box-shaped type including an openable and closable rear gate 30c, and is mounted to the vehicle body 11 so as to be dumpable. Specifically, the loading platform 30 includes a loading platform frame 30F extending in a front and rear direction of the truck 10 on a lower surface, and a rear portion of the loading platform frame 30F is joined to a rear end of the frame 11F of the vehicle body 11 via a pivot axis 31 so as to be dumpable. Thus, the loading platform 30 can pivot around the pivot axis 31 between a normal position where the loading platform 30 is horizontally supported on the frame 11F of the vehicle body 11 and a dump position where the loading platform 30 is inclined upward to a front.

At upper left and right corners in a front wall 30b of the loading platform 30, arcuate grips 33 used for a manual dump operation of the loading platform 30 are formed. Thus, a sufficient distance can be ensured between the pivot axis 31 and the grips 33. Therefore, when a user standing on one lateral side of the loading platform 30 grips and pulls up the grip 33 on the same side for dumping the loading platform 30, the user can dump the loading platform 30 with a relatively small pulling force.

Between the loading platform and the vehicle body 11, an auxiliary dumper 32 for assisting the dump operation of the loading platform 30 is mounted. In a lower portion at a front end of the loading platform 30, a manual lock device 34 is provided that can lock the loading platform 30 to the vehicle body 11 in the horizontal normal position.

Figure 8:
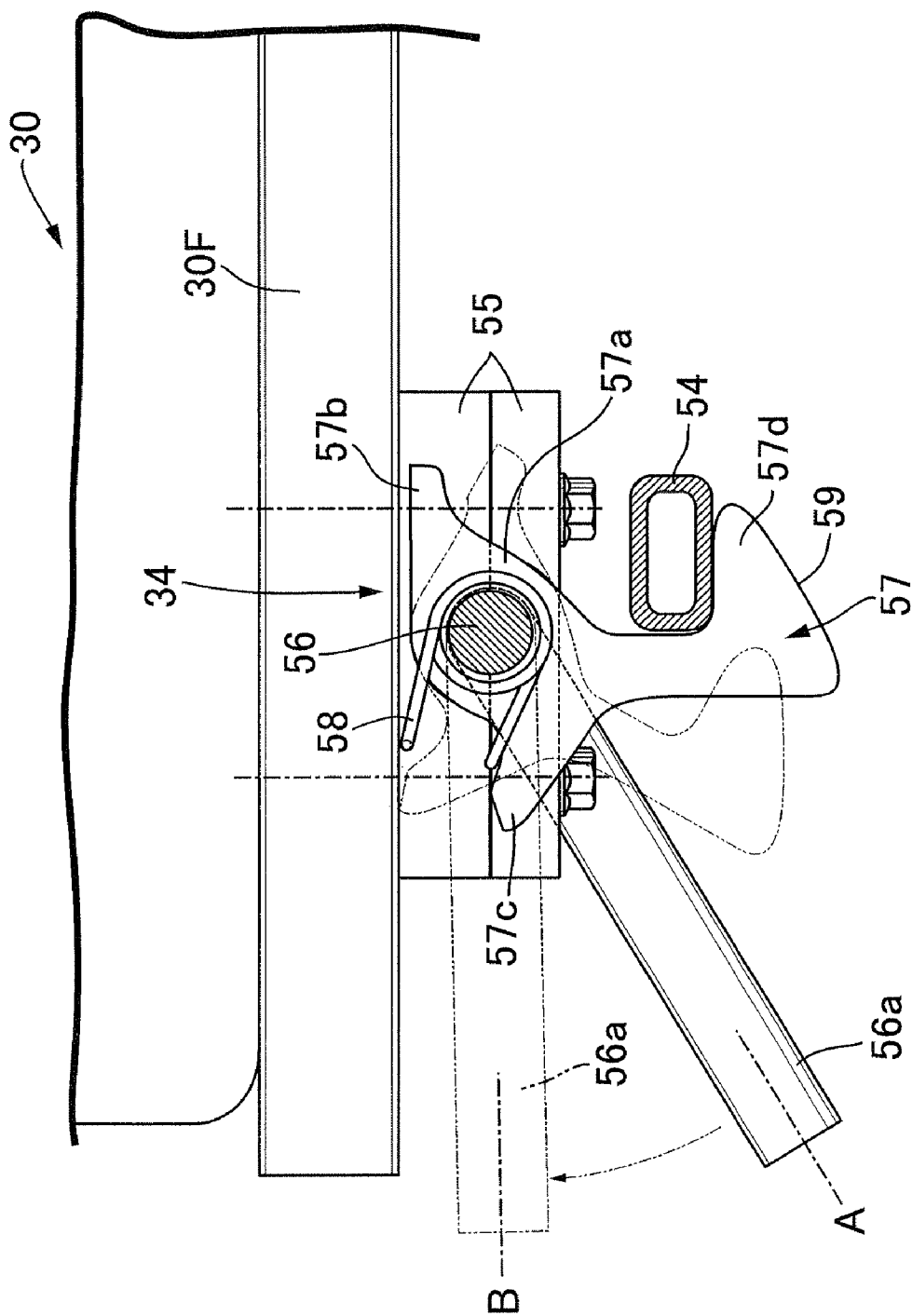
FIG. 8 is a side view of a lock device of the loading platform.

As shown in FIGS. 2, 4 and 8, the lock device 34 includes a lever shaft 56 rotatably supported by a bearing member 55 secured to a lower surface of the loading platform frame 30F and extending in a laterally horizontal direction, and a lock pawl 57 secured integrally with the lever shaft 56, and operating levers 56a that can pivot between a lock position A and an unlock position B described later are formed at left and right ends of the lever shaft 56. The lock pawl 57 includes a boss portion 57a fitted and secured to the lever shaft 56, first and second stopper arms 57b and 57c radially protruding from the boss portion 57a, and a pawl portion 57d. The first and second stopper arms 57b and 57c abut against the lower surface of the loading platform frame 30F to regulate the lock position A and the unlock position B, respectively, of the operating lever 56a. When the operating lever 56a is in the lock position A, the pawl portion 57d engages a lower surface of a retaining portion 54 formed in the loading platform frame 30F to hold the loading platform 30 in the horizontal normal position. When the operating lever 56a is in the unlock position B, the pawl portion 57d is disengaged from the retaining portion 54. To an outer periphery of the lever shaft 56, a lock spring 58 that biases the lock pawl 57 toward the lock position A of the operating lever 56a and that is formed by a torsion coil spring is mounted. Thus, in dumping the loading platform 30, one of the left and right operating levers 56a is pivoted to the unlock position B to disengage the lock pawl 57 from the retaining portion 54.

A slope portion 59 is formed on a back surface of the pawl portion 57d. If the operating lever 56a is in the lock position A when the loading platform 30 is returned from the dump position to the normal position, the slope portion 59 causes the lock pawl 57 and the operating lever 56a to pivot to the unlock position B against a biasing force of the lock spring 58 while sliding on the retaining portion 54. When the slope portion 59 passes through the retaining portion 54, the lock pawl 57 and the operating lever 56a are pivoted to the lock position A by a repulsive force of the lock spring 58, and thus the loading platform 30 is automatically locked in the normal position.

Figure 14:
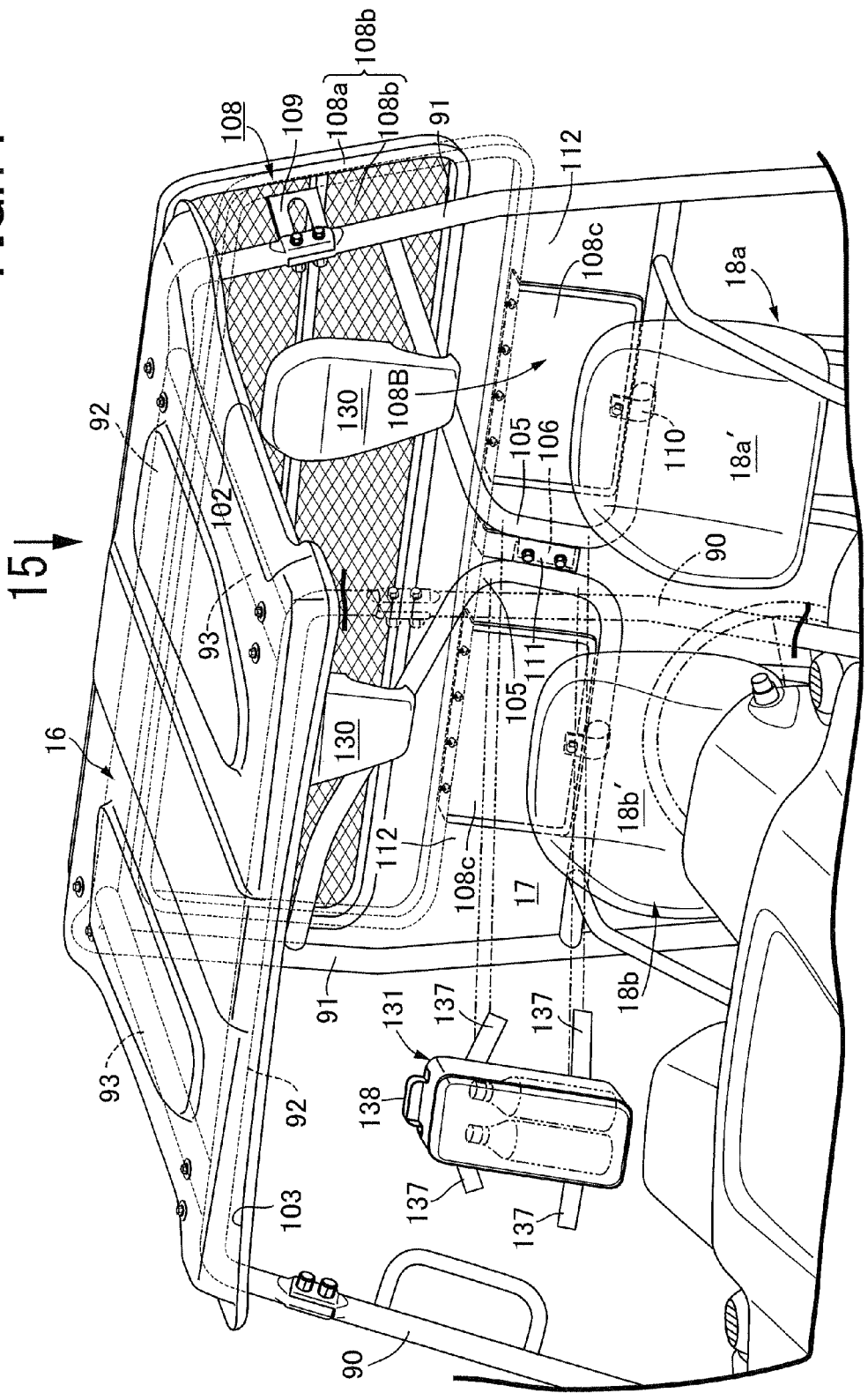
FIG. 14 is a front perspective view showing the cabin and its surroundings of the truck in FIG. 1.

In FIGS. 1, 4 and 14, the vehicle body 11 includes pairs of left and right front pillars 90 and rear pillars 91 so as to surround the cabin 17. The pairs of front pillars 90 and rear pillars 91 are integrally connected at upper ends via a pair of front and rear cross pipes 92 extending in a lateral direction. A pair of lateral cross pipes 92 are connected to each other via a pair of left and right longitudinal cross pipes 93 extending in a front and rear direction. The roof 16 is mounted to the lateral and longitudinal cross pipes 92 and 93 as described below.

Figure 15:
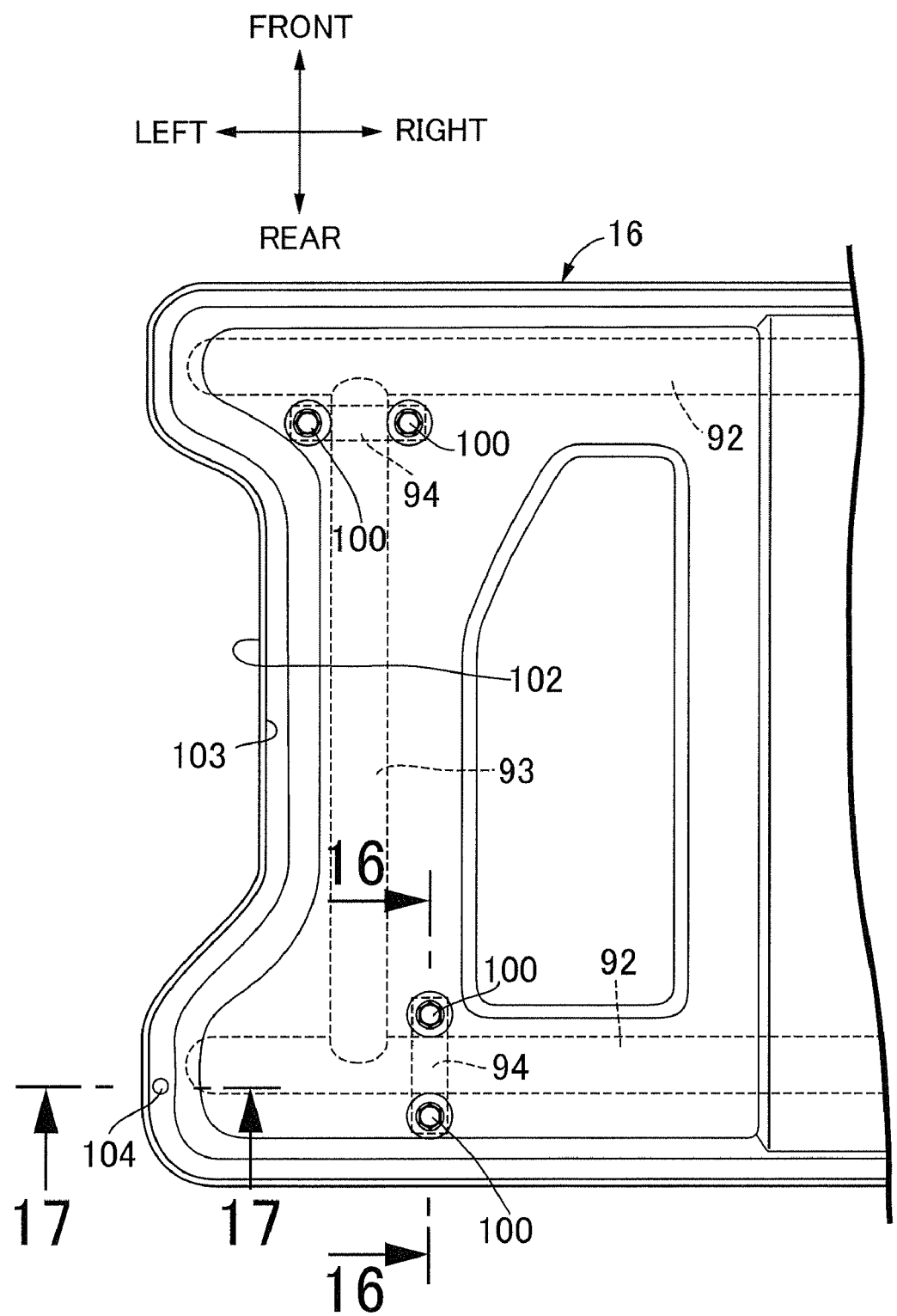
FIG. 15 is a view taken in the direction of arrow 15 in FIG. 14 showing a roof of the cap.
Figure 16:
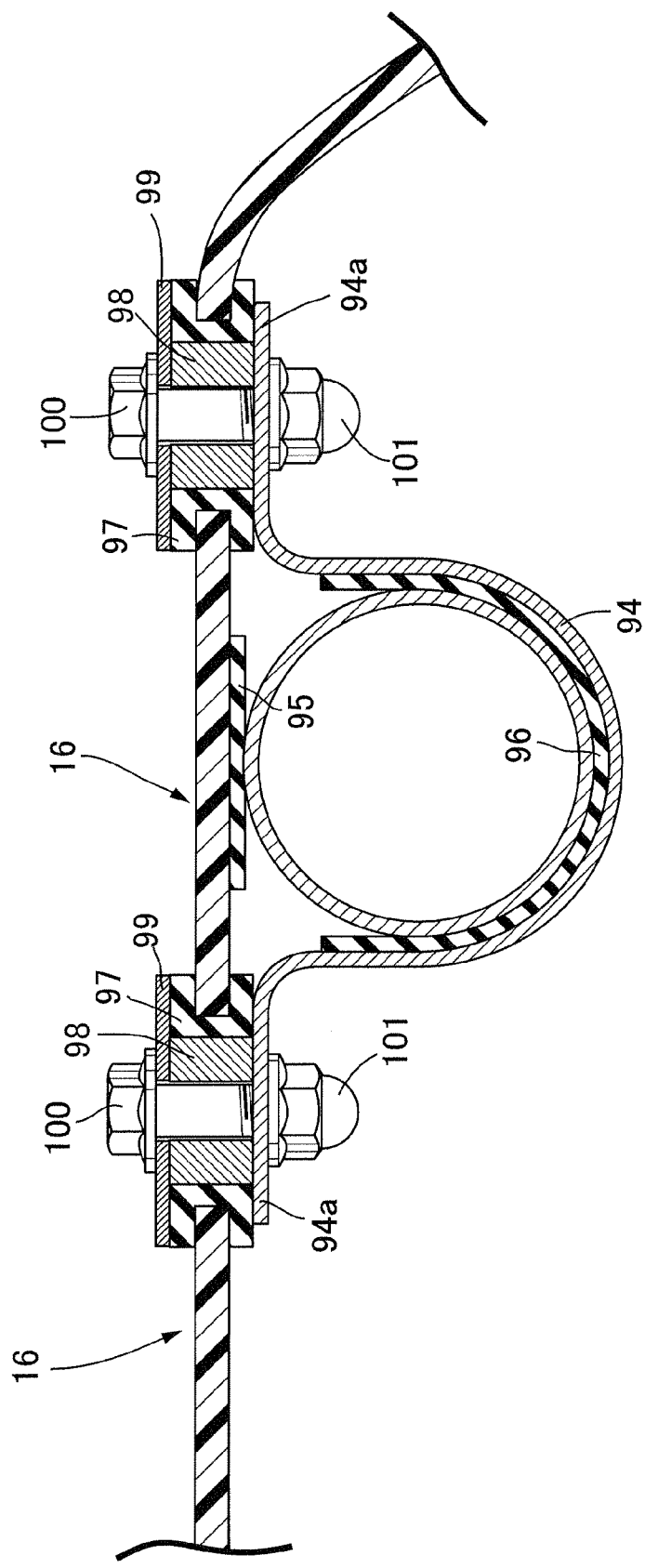
FIG. 16 is an enlarged sectional view taken along the line 16-16 in FIG. 15.
Figure 17:
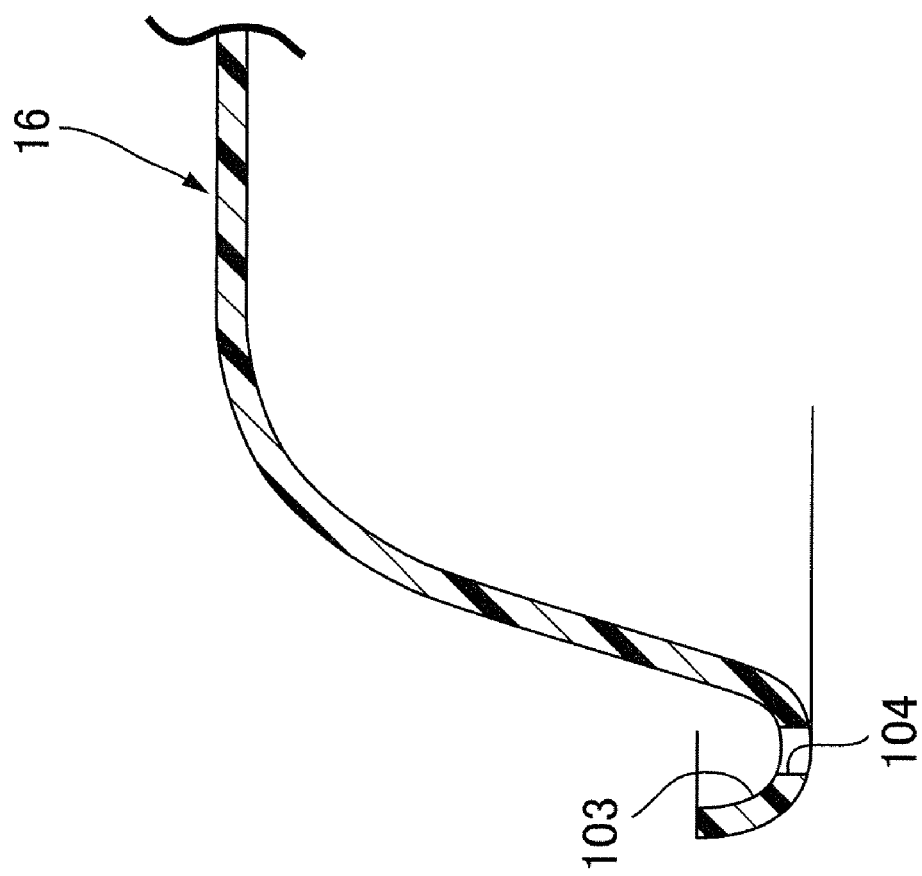
FIG. 17 is an enlarged sectional view taken along the line 17-17 in FIG. 15.
Figure 18:
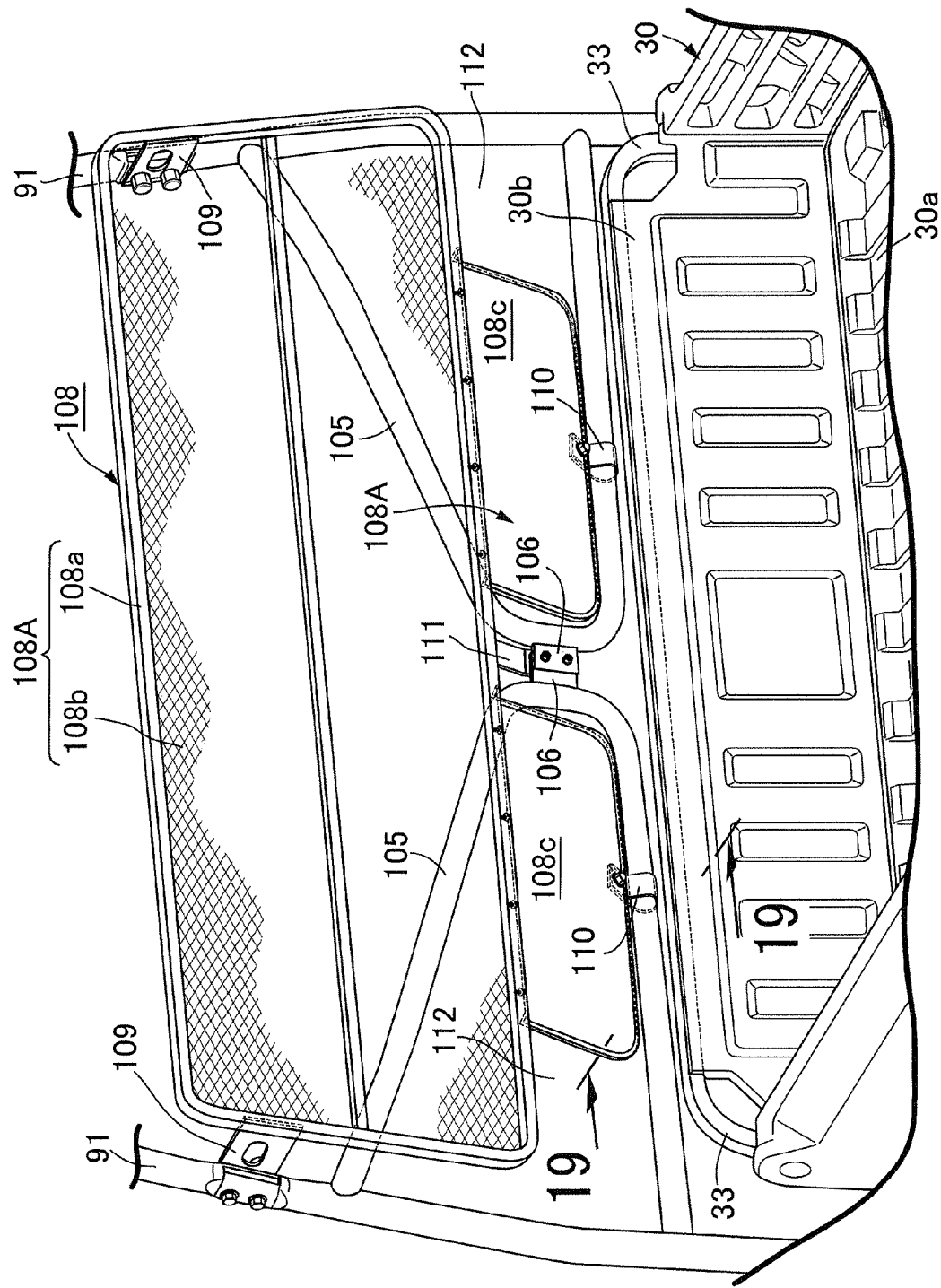
FIG. 18 is a rear perspective view of the truck showing a protection screen and its surroundings in a rear portion of the cabin.

As shown in FIGS. 15 to 17, the roof 16 is made of synthetic resin or steel plate, and placed on the lateral and longitudinal cross pipes 92 and 93 with an upper cushion plate 95 of rubber interposed therebetween. In appropriate positions on the lateral and longitudinal cross pipes 92 and 93, roof holding members 94 that fit lower half peripheries of the pipes are placed with lower cushion plates 96 interposed therebetween. The roof holding members 94 have, at opposite ends thereof, ear portions 94a protruding outward of the lateral and longitudinal cross pipes 92 and 93, and each ear portion 94a is placed to support, from below, a rubber grommet 97 mounted to an appropriate position on the roof 16, and a distance collar 98 fitted in the center of the grommet 97. A washer 99 is placed on an upper end of the grommet 97 and the distance collar 98, and the washer 99 and the ear portion 94a are fastened by a bolt 100 and a cap nut 101. Thus, the roof 16 is supported by the upper and lower cushion plates 95 and 96 and the grommets 97 so as to isolate vibration, and a preload is applied to the roof 16 along the lateral and longitudinal cross pipes 92 and 93 by a compression repulsive force of the upper cushion plates 95, thereby preventing a flutter of the roof 16 by running air or vibration. Such a support structure of the roof is particularly effective for a roof 16 made of synthetic resin.

As clearly shown in FIG. 15, the roof 16 basically has a laterally long rectangular shape, and has recesses 102 in left and right side edges. The recesses 102 and a below described trough 103 formed along an entire periphery of the roof 16 cooperate to increase rigidity of the roof 16 particularly in the front and rear direction and improve design.

The roof 16 has a gradient (for example, 3 to 10°, preferably 1.5°) slightly sloping downward to a rear portion and a gradient (for example, 3 to 10°, preferably 5°) sloping downward from the middle portion toward left and right sides. The trough 103 is formed to extend continuously along the entire periphery of the roof 16. Thus, in the trough 103, left and right corners in the rear portion of the roof 16 are the lowest, and drain holes 104 (see FIGS. 15 and 17) are provided in the corners. Thus, when the truck 10 is in a substantially horizontal position, rainwater falling on the roof 16 can be collected in the trough 103 in the entire periphery of the roof 16, smoothly guided into the drain holes 104, and drained to the outside of the cabin 17. Thus, the roof 16 drains well, and within the above described ranges of the gradients, design of the truck 10 is not damaged.

In this case, the drain holes 104 are provided in an intermediate portion between the seats 18A and 18B in the cabin 17 and the loading platform 30, thereby preventing raindrops from the drain holes 104 from falling on the seats 18A and 18B or the loading platform 30 during stopping in rain.

In FIGS. 1, 14, 18 and 19, opposite ends of a pair of left and right U-shaped reinforcement stays 105 placed behind the left and right seats 18a and 18b, respectively, with bent portions facing each other, are joined to the left and right rear pillars 91 by welding. The reinforcement stays 105 have, in portions facing each other, joint pieces 106 superposed one on another, and the joint pieces 106 are joined to each other by bolts 107. To the reinforcement stays 105 and the rear pillars 91, a protection screen 108 that covers a rear surface of the cabin 17 is mounted.

The protection screen 108 includes a rectangular upper screen 108A having a width substantially the same as that of the loading platform 30 and placed above the loading platform 30, and a lower screen 108B continuously connected to a lower end of the upper screen 108A. The upper screen 108A includes a screen frame 108a that forms a rectangular outline and a mesh member 108b made of metal mesh and attached to the screen frame 108a.

The lower screen 108B includes a pair of left and right skirt plates 108c made of metal, for example, aluminum alloy and secured to a lower portion of the screen frame 108a. The skirt plates 108c are placed behind the left and right seats 18a and 18b. The screen frame 108a is secured, at left and right sides, to the left and right rear pillars 91 via brackets 109, and secured, at a lower middle portion, to the joint piece 106, that is, below the reinforcement stay via a bracket 111. The left and right skirt plates 108c are secured, at lower end portions respectively, to lower portions of the left and right reinforcement stays 105 via metal bands 110. The protection screen 108 thus configured can prevent a load on the loading platform 30 from entering the cabin 17, and simultaneously the mesh member 108b can ensure a rearward visibility from the cabin 17.

In the above described configuration, a total width of the left and right skirt plates 108c is smaller than that of the screen frame 108a, and thus a cut-out space 113 that does not interfere with a trail 112 (see FIGS. 4 and 19) of the grip 33 in the dump operation of the loading platform 30 are provided below left and right ends of the screen frame 108a.

Thus, the grip 33 and also a user's hand gripping the grip 33 can easily pass through the space 113 in the dump operation of the loading platform 30 by gripping the grip 33, thereby easily avoiding interference with the protection screen 108. Further, the space 113 is formed by the total width of the left and right skirt plates 108c being smaller than the width of the screen frame 108a, and thus the space 113 can be easily formed without forming a special cut-out in the protection screen 108.

Figure 19:
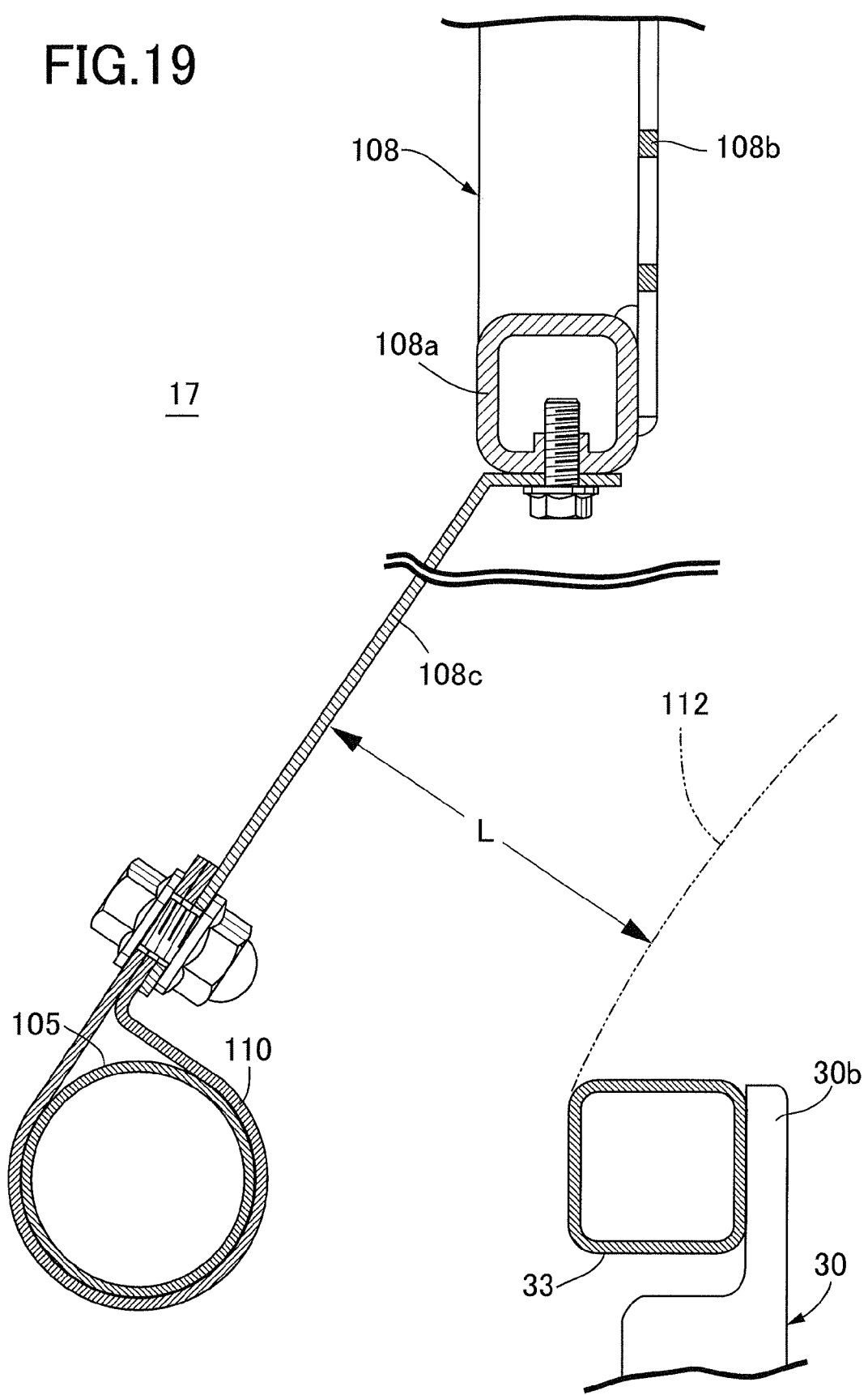
FIG. 19 is an enlarged sectional view taken along the line 18-18 in FIG. 18.

The screen frame 108a is placed substantially immediately above the front wall 30b of the loading platform 30, and the skirt plates 108c are placed to be tilted forward at lower portions along sloping back surfaces of seat backs 18a' and 18b' of the seats 18a and 18b provided in the cabin 17 (see FIGS. 4 and 19). With this configuration, a sufficient distance L between the front wall 30b of the loading platform 30 and the skirt plates 108c can be sufficiently ensured while an effective volume of the cabin 17 is increased, thereby reliably avoiding interference between the front wall 30b of the loading platform 30 and the skirt plates 108c in the dump operation of the loading platform 30.

Further, the left and right skirt plates 108c are configured to cover the seat backs 18a' and 18b' of the left and right seats 18a and 18b provided in the cabin 17 over the entire widths (see FIG. 14). With this configuration, the skirt plates 108c can reliably avoid a luggage from moving from the loading platform 30 to the seat backs 18a' and 18b' while ensuring the space 113.

Figure 7:
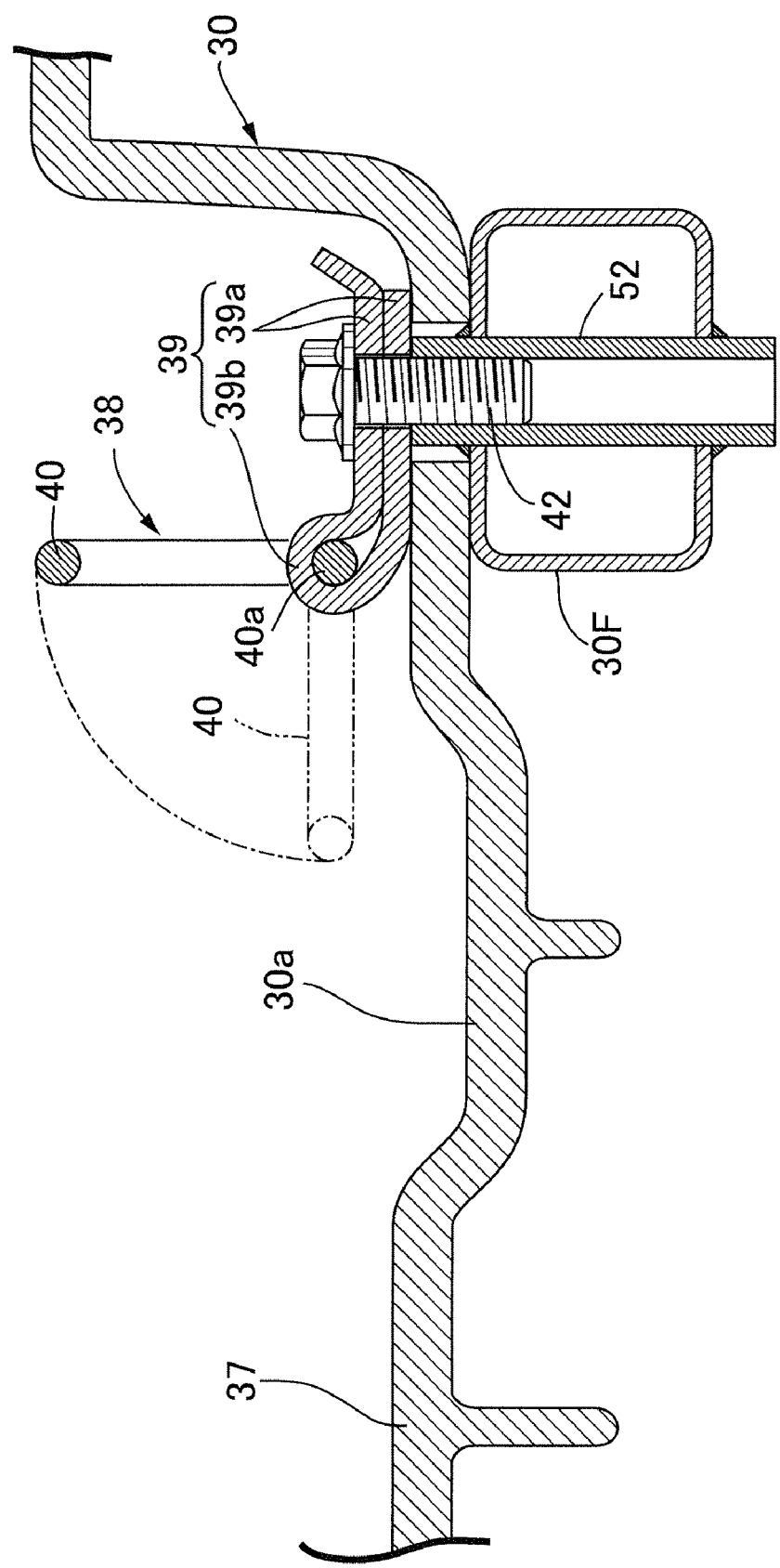
FIG. 7 is a sectional view taken along the line 7-7 in FIG. 5.

As shown in FIG. 5, a floor 30a of the loading platform 30 is made of synthetic resin, and has a plurality of ribs 37, 37... extending in the front and rear direction of the truck 10. On the floor 30a, a pair of front and rear load securing tools 38 and 38; 38 and 38 are provided on left and right sides. As clearly shown in FIGS. 7 and 8, each load securing tool 38 includes a support member 39 mounted to the floor 30a, and a hook member 40 supported by the support member 39. The support member 39 includes a base 39a, and a boss portion 39b continuously connected to one end of the base 39a. The hook member 40 is formed of a D-ring, and a straight shaft 40a thereof is rotatably supported by the boss portion 39b. At this time, between the shaft 40a and the boss portion 39b, friction is applied such that the hook member 40 can be held in a horizontal position, any tilted position, and a standing position.

The bases 39a of the support members 39 are placed so that the boss portions 39b of the left and right load securing tools 38 face each other, and secured to the floor 30a by bolts 42. At this time, each base 39a is held between a pair of front and rear positioning pieces 43 and 43 welded to the floor 30a and prevented from rotating around the bolt 42 and vibrating in a disordered manner. Thus, the base 39a can be reliably secured to the floor 30a only by single bolt 42. The bolt 42 is screwed into a support cylinder 52 secured to the loading platform frame 30F and having an upper end facing the upper surface of the floor 30a of the loading platform 30 and is tightly fastened.

On the upper surface of the floor 30a, a pair of bumps 44 and 45 that are arranged in the axial direction of the boss portion 39b of the load securing tool 38 with the load securing tool 38 therebetween are formed. When a load on the floor 30a is placed immediately above the load securing tool 38, the bumps 44 and 45 receive the load and prevent interference between the load and the load securing tool 38.

Figure 20:
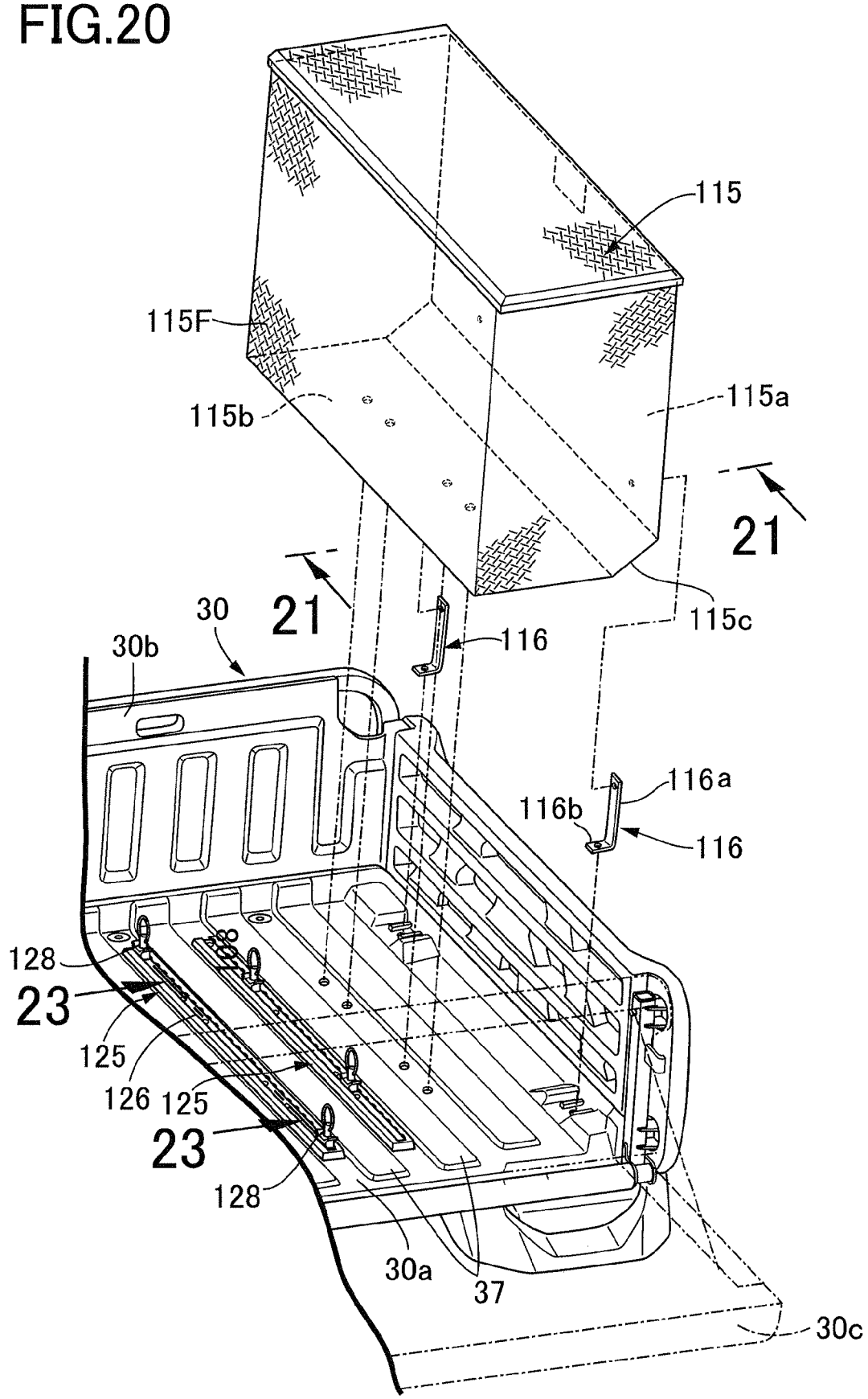
FIG. 20 is an exploded perspective view of the loading platform of the truck in FIG. 1 and a luggage box mounted to the loading platform.
Figure 21:
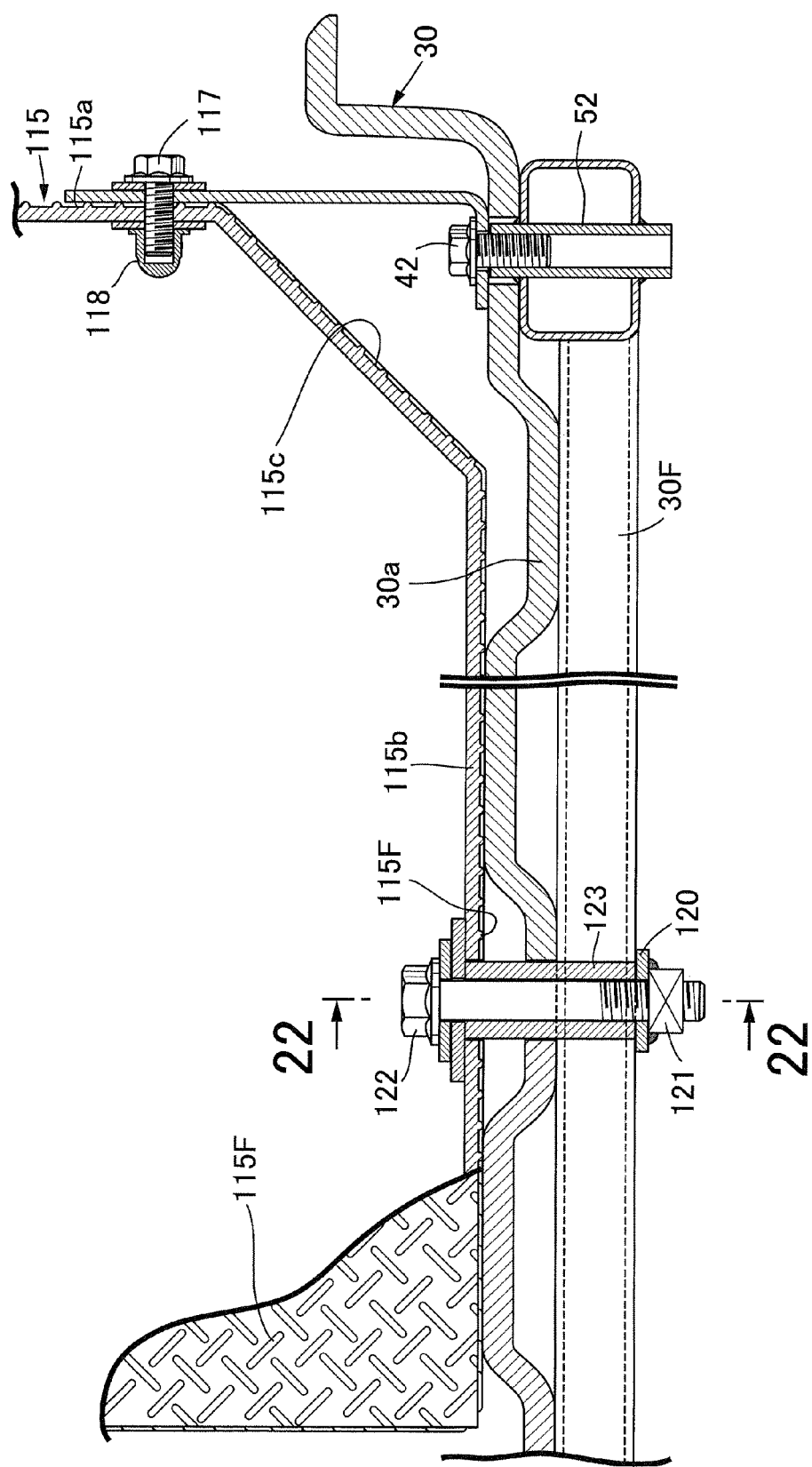
FIG. 21 is an enlarged sectional view taken along the line 21-21 in FIG. 20 showing a mounting structure of the luggage box to the loading platform.
Figure 22:
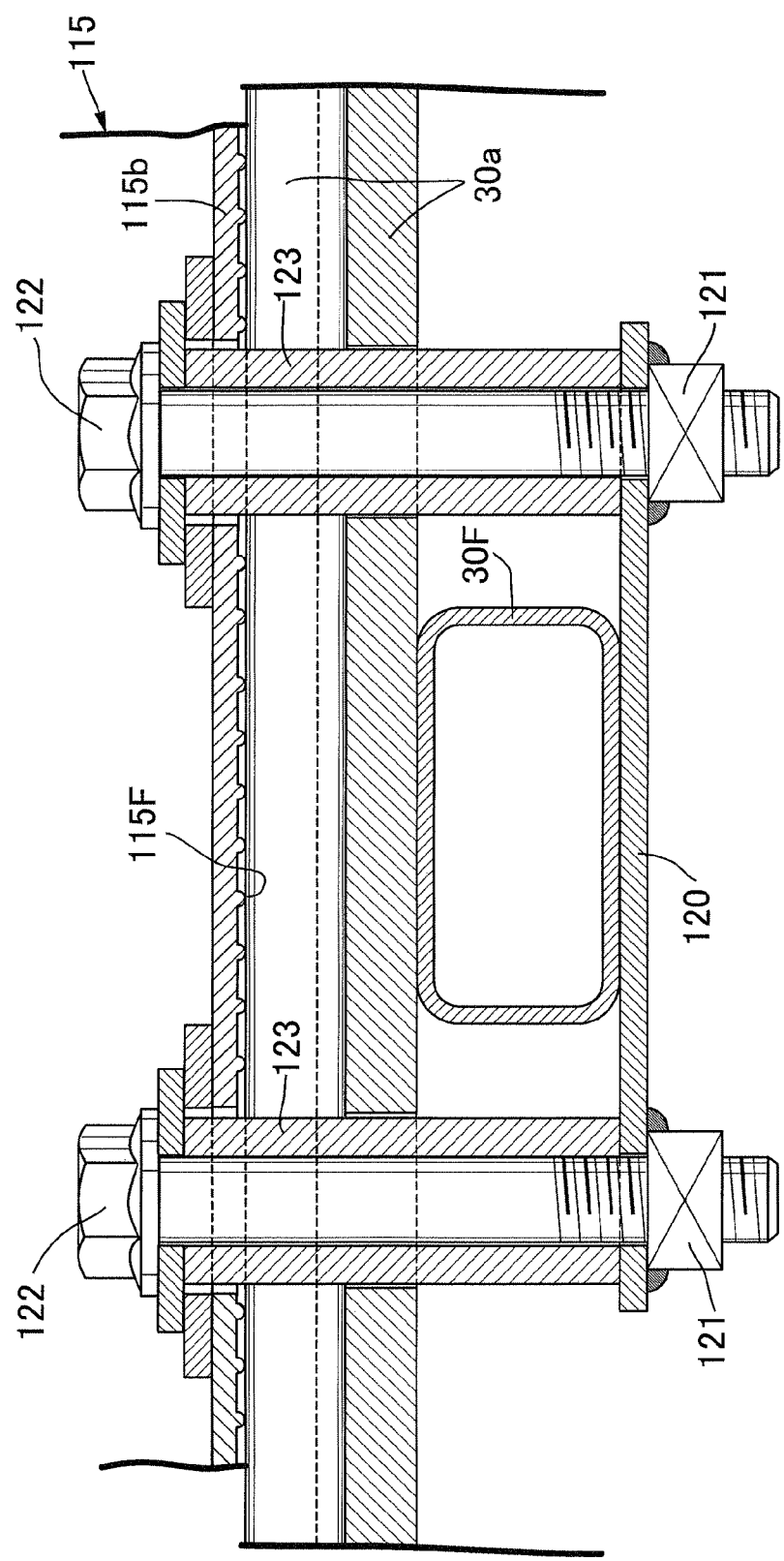
FIG. 22 is a sectional view taken along the line 22-22 in FIG. 21.

As shown in FIGS. 20 to 22, a luggage box 115 is mounted to one lateral side of the floor 30a of the loading platform 30 as required. For mounting the luggage box 115, the bolts 42 and the support cylinders 52 are used for mounting the pair of front and rear load securing tools 38 and 38 on one side of the loading platform 30. Specifically, the bolts 42 are removed from the support cylinders 52 to remove the front and rear load securing tools 38 and 38, then horizontal portions 116a of L-shaped joint seats 116 are secured to the support cylinders 52 by the bolts 42, and vertical portions 116b of the joint seats 116 are secured to an outer side wall 115a of the luggage box 115 by bolts 117 and cap nuts 118. A bottom wall 115b of the luggage box 115 is secured to the loading platform frame 30F by a plurality of bolts 122. Specifically, a holding plate 120 including welding nuts 121 at opposite ends is placed beneath the lower surface of the loading platform frame 30F, and the bolt 122 passing through the bottom wall 115b of the luggage box 115 and the floor 30a is screwed into the welding nut 121 and tightly fastened, and thus the luggage box 115 is secured to the loading platform frame 30F. At this time, to an outer periphery of the bolt 122, a distance collar 123 that controls fastening of the bolt 122 is fitted, and an upper end of the distance collar 123 passes through the bottom wall 115b of the luggage box 115 and abuts against a washer at a head portion of the bolt 122. Thus, the outer side wall 115a and the bottom wall 115b of the luggage box 115 are secured to the loading platform 30, and thus the luggage box 115 can obtain sufficient support strength against a lateral load. At a corner portion between the outer side wall 115a and the bottom wall 115b of the luggage box 115, a chamfer 115c is formed that avoids interference with the bumps 44 and 45 on the floor 30a and the bolt 117.

The luggage box 115 is formed of a checkered steel plate, and an irregular surface 115F of the checkered pattern is an outer wall surface to prevent a slip. In this case, as described above, when the bottom wall 115b of the luggage box 115 is secured to the loading platform frame 30F by the bolts 122, an upper end of the distance collar 123 around the bolt 122 is caused to pass through the bottom wall of the luggage box 115 and abut against the washer at the head portion of the bolt 122. Thus, a fastening force of the bolt 122 can be transmitted without passing through the irregular surface 115F of the luggage box 115, thereby preventing the bolt 122 from being loosened by crushed protrusions on the irregular surface 115F.

Figure 23:
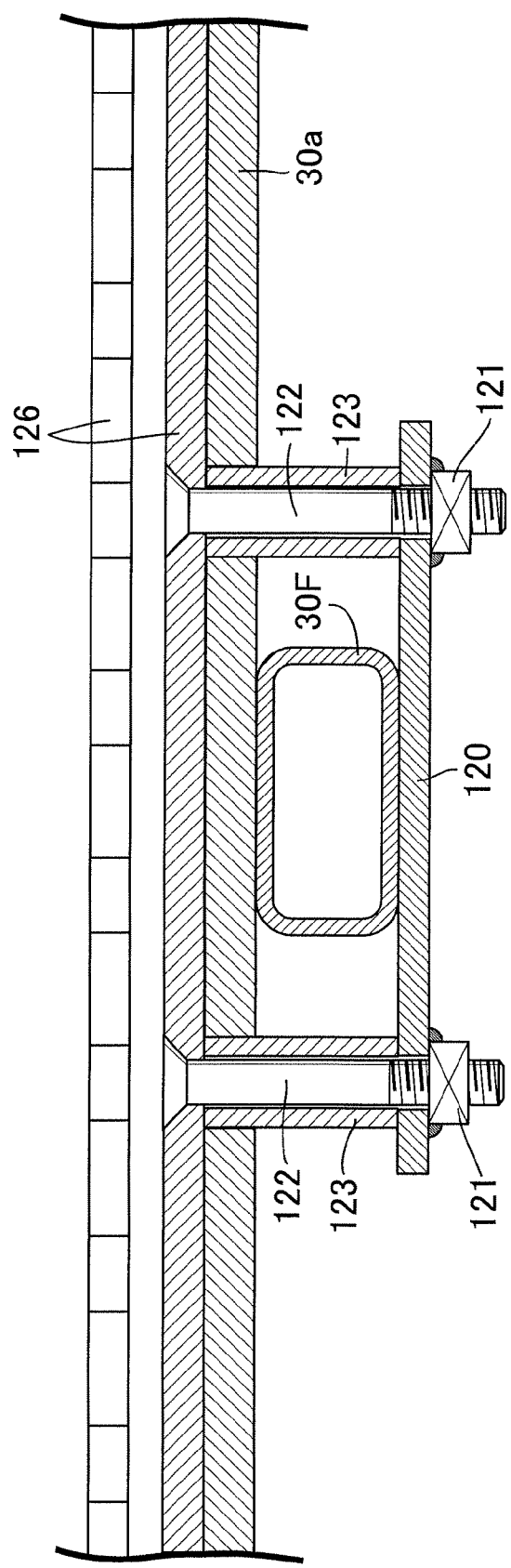
FIG. 23 is an enlarged sectional view taken along the line 23-23 in FIG. 20.
Figure 24:
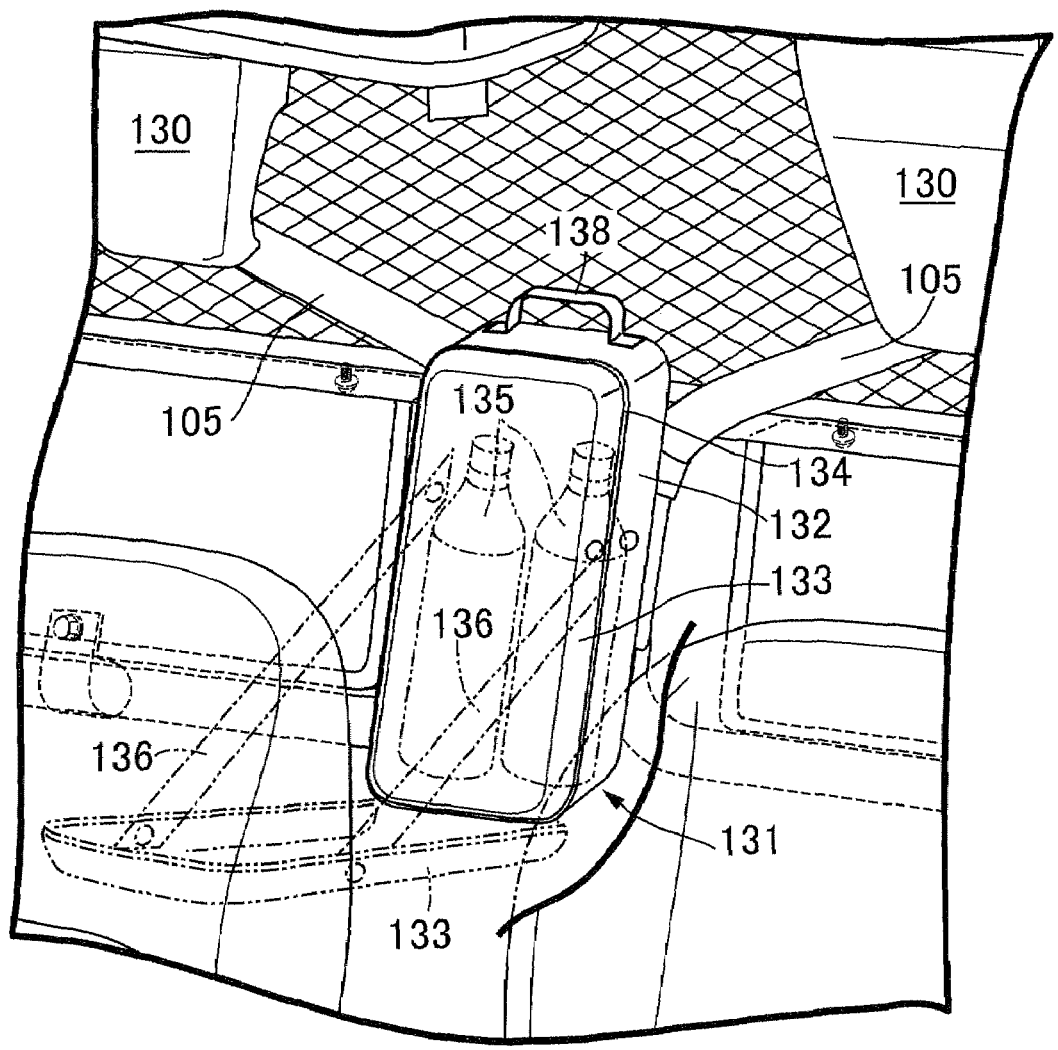
FIG. 24 is a front perspective view of a console bag and its surroundings in the cabin.
Figure 25:
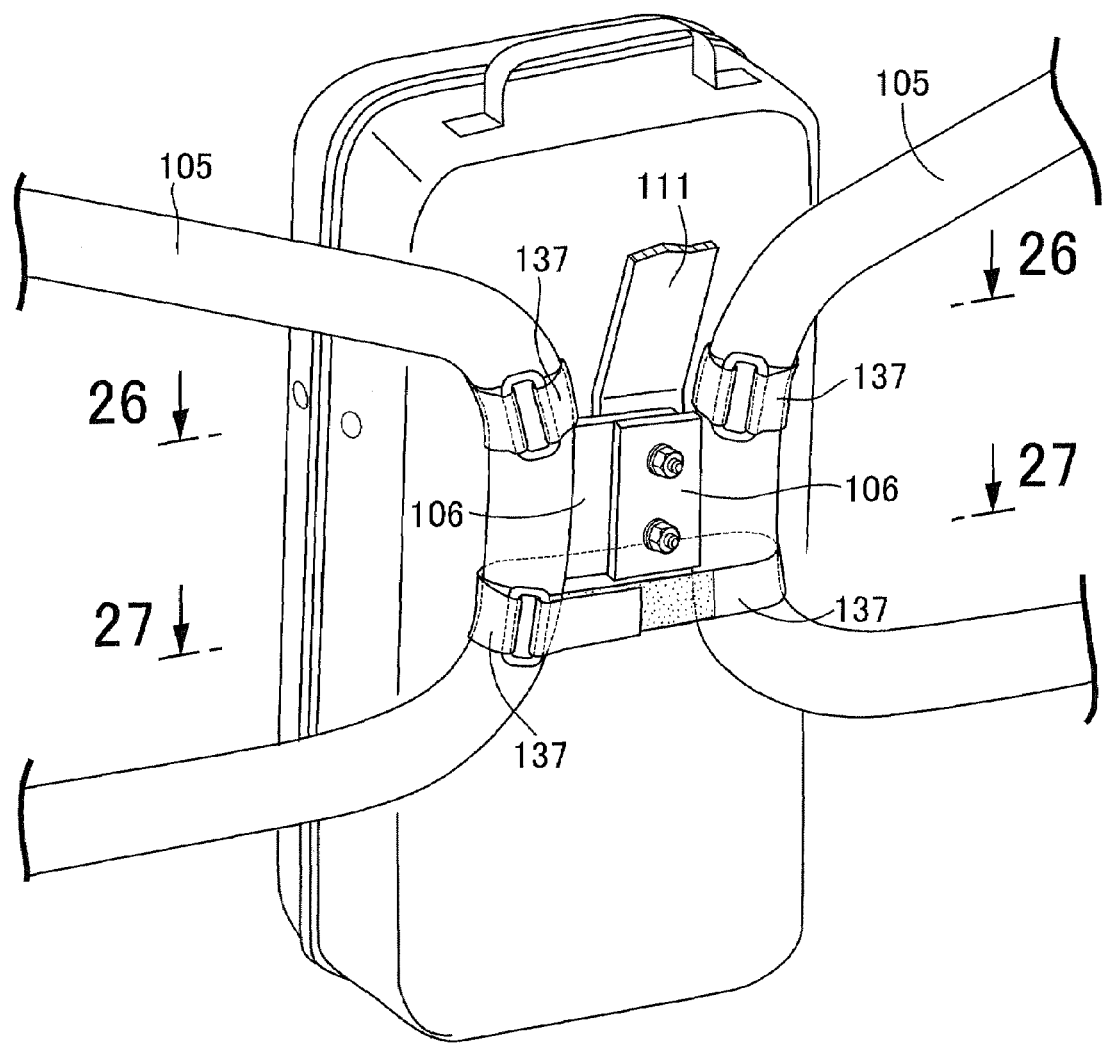
FIG. 25 is a rear perspective view of the console bag and its surroundings.
Figure 26:
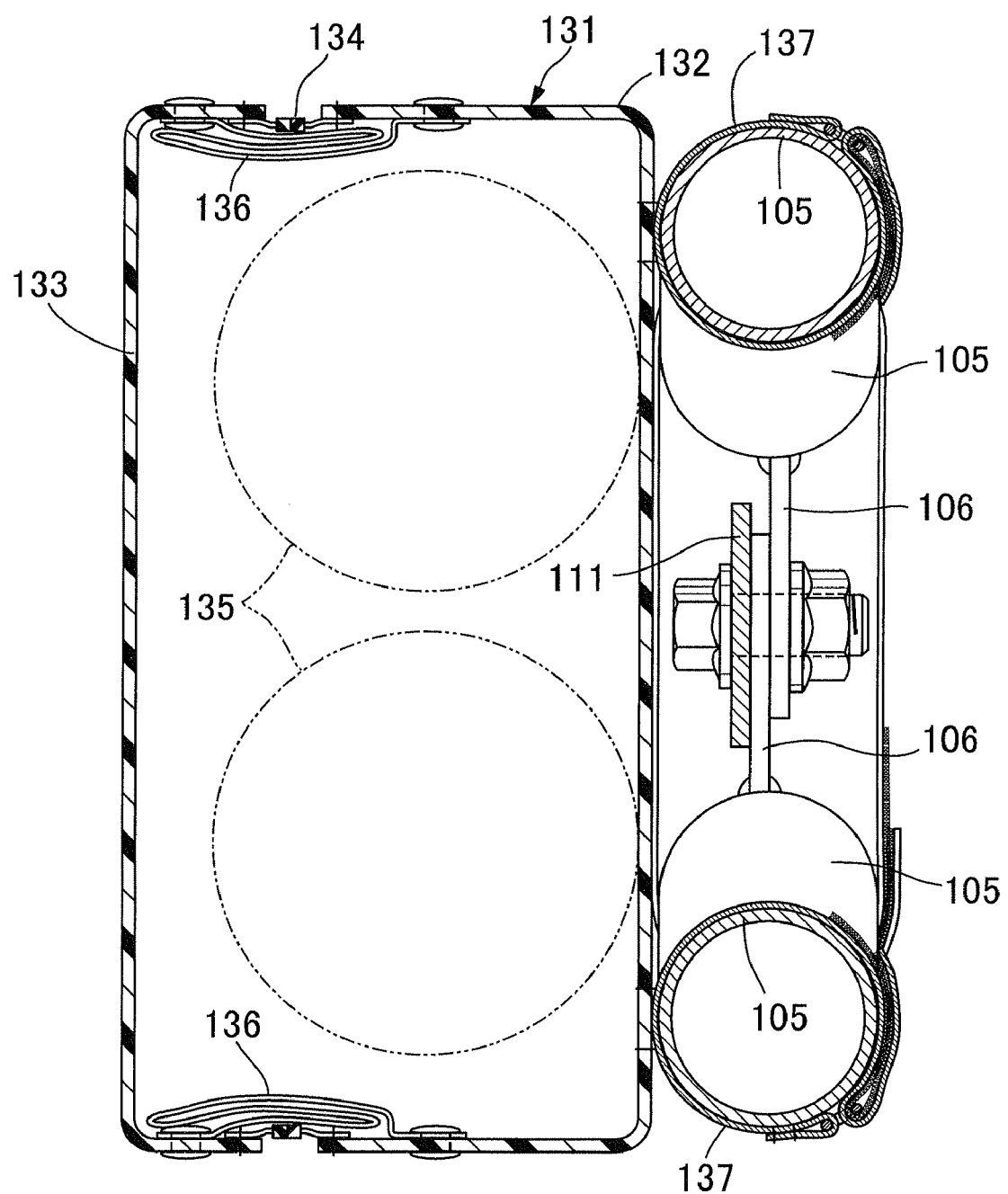
FIG. 26 is an enlarged sectional view taken along the line 26-26 in FIG. 25.
Figure 27:
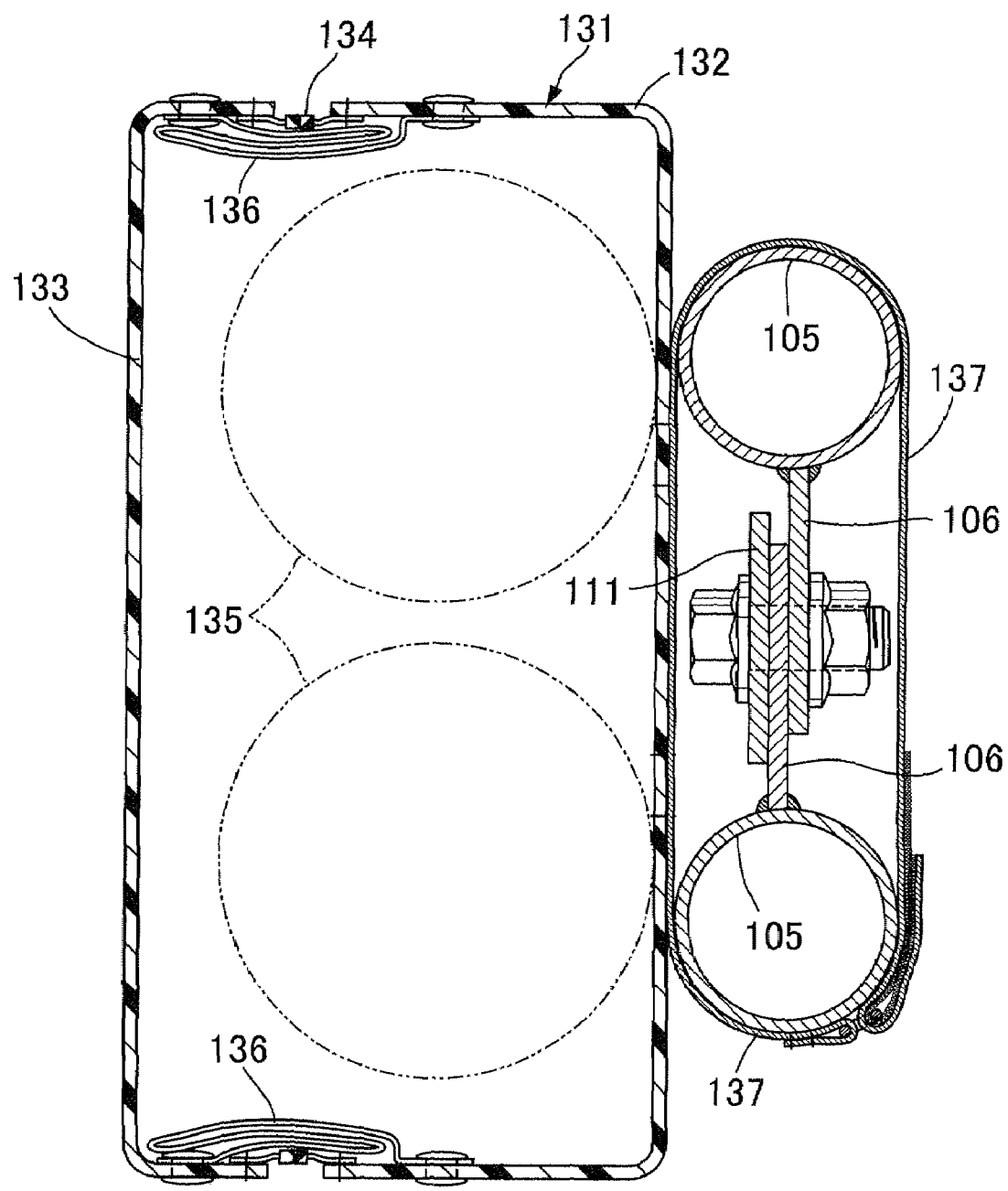
FIG. 27 is an enlarged sectional view taken along the line 27-27 in FIG. 25.

As shown in FIGS. 20 and 23, a slide type load securing means 125 is mounted to the floor 30a of the loading platform 30 as required. The slide type load securing means 125 includes a plurality of hook rails 126 provided between a plurality of reinforcement ribs 142 in a front and rear direction on the upper surface of the floor 30a, and one or more hook members 128 slidably fitted to the hook rails 126 and secured in any slide position.

Each hook rail 126 is secured to the loading platform frame 30F, and a securing structure thereof is basically the same as the securing structure of the bottom wall 115b of the luggage box 115 to the loading platform frame 30F except shapes and sizes of components, thus in FIG. 23, components corresponding to those in the securing structure in FIG. 22 are denoted by the same reference numerals and descriptions of the structure will be omitted.

Figure 9:
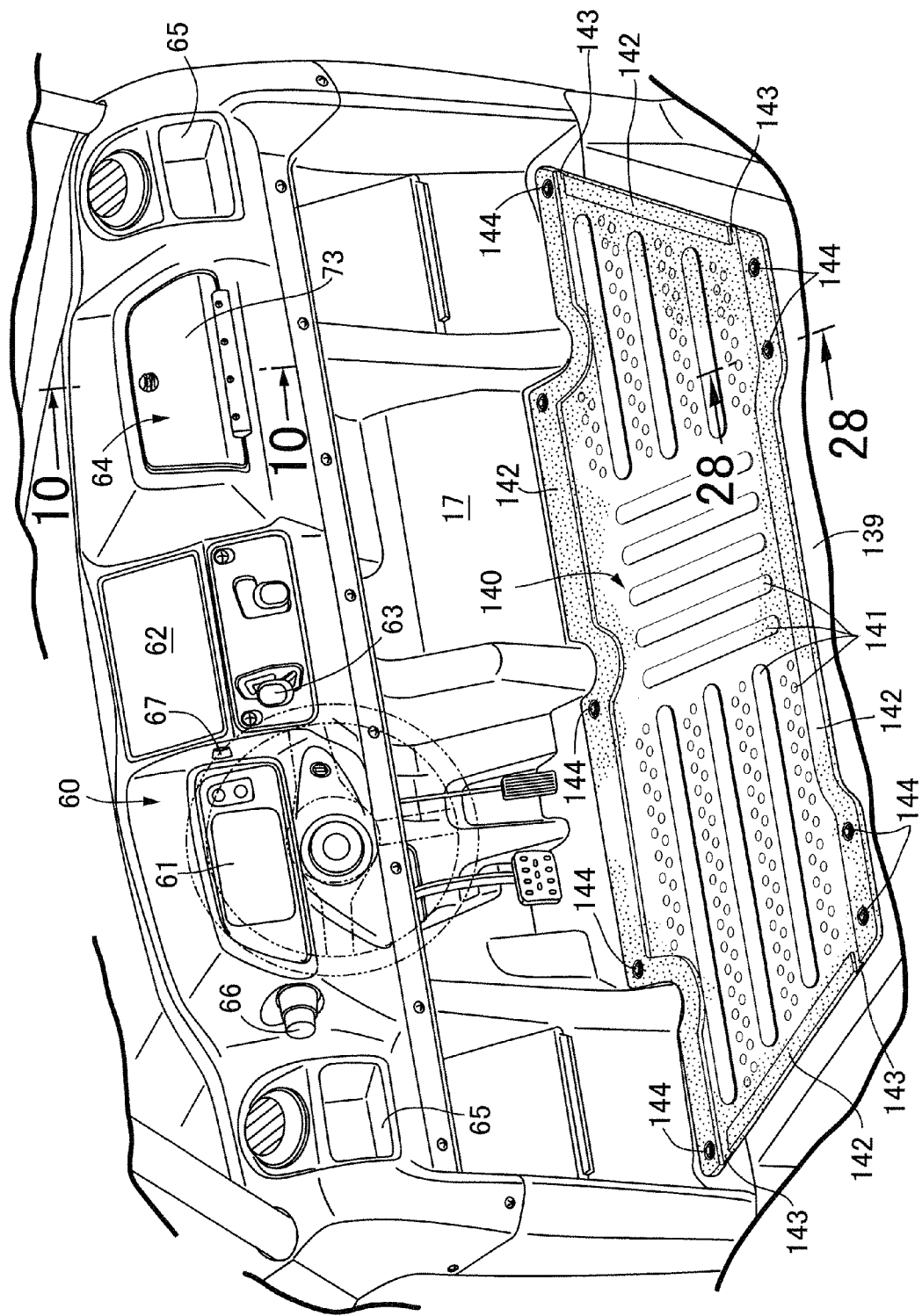
FIG. 9 is a perspective view of a side of an instrument panel in a cabin of the truck in FIG. 1.

In FIG. 9, in an instrument panel 60 provided in a front portion of the cabin 17, a meter unit 61, an audio unit 62, a shift lever 63, a glove box device 64, a small article container 65, a lighting switch 66, a horn switch 67, or the like are provided.

Figure 10:
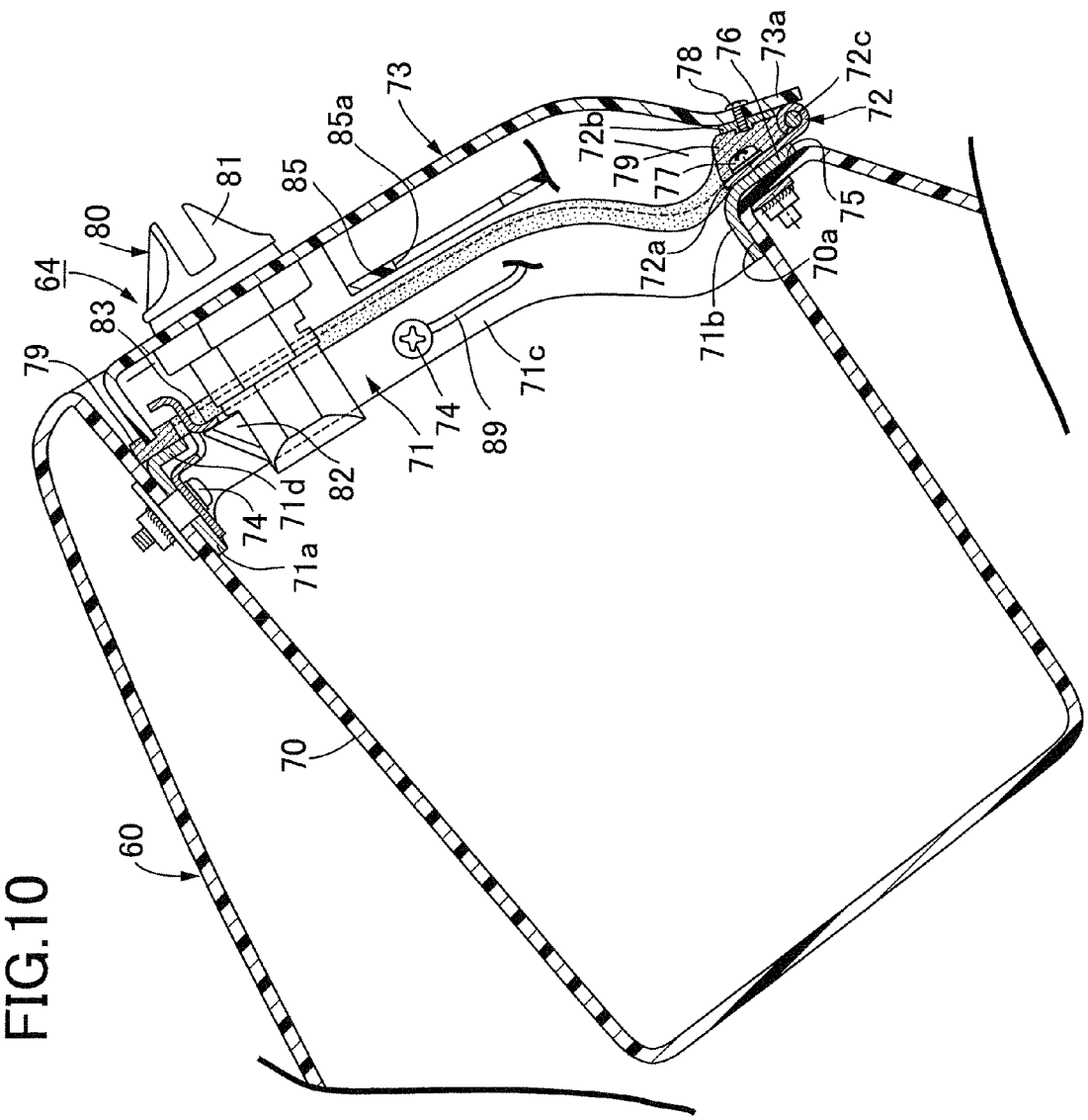
FIG. 10 is an enlarged sectional view taken along the line 11-11 in FIG. 9 showing a glove box device in the instrument panel.

The glove box device 70 will be described in detail with reference to FIGS. 10 to 12. The glove box device 70 includes a glove box 70 integrally formed with the instrument panel 60, a lid mounting frame 71 of an angularly-sectored prism shape formed so as to be fitted to an inner peripheral surface of a rectangular opening portion 70a of the glove box 70 opening in a front surface of the instrument panel 60, and a lid 73 joined to the lid mounting frame 71 via a hinge 72 so as to be opened and closed with respect to the opening portion 70a. The lid mounting frame 71 fitted to the inner peripheral surface of the opening portion 70a of the glove box 70 is secured to the instrument panel 60 at an upper wall 71a and left and right side walls 71c by one or two first screws 74.

A flat positioning wall 75 bending downward from a lower edge of the opening portion 70a is formed in the instrument panel 60, and a positioning piece 76 that abuts against the positioning wall 75 is continuously and integrally connected to a lower wall 71b of the lid mounting frame 71.

The hinge 72 is comprised of first and second hinge arms 72a and 72b, and a hinge pin 72c that joins the first and second hinge arms 72a and 72b rotatably relative to each other, and the first hinge arm 72a is secured to the instrument panel 60 by a pair of second screws 77 so as to hold the positioning piece 76 between the first hinge arm 72a and the positioning wall 75. Thus, the lid mounting frame 71 is secured to the instrument panel 60 by the first screws 74 and the second screws 77, and the first hinge arm 72a of the hinge 72 is simultaneously secured by the second screws 77. The second hinge arm 72b is secured to an inner surface of a lower end portion of the lid 73 by a plurality of third screws 78.

In a front surface of the lid mounting frame 71, a flange 71d bending inward from an upper portion and left and right sides is formed, and a seal member 79 brought into tight contact with the lid 73 in a closed state is bonded to an area extending from the flange 71d to the positioning piece 76 so as to cover the second screws 77. Thus, if the lid 73 is closed and locked by lock means 80 described later, the seal member 79 seals the opening portion 70a of the glove box 70 to maintain sealed state, and also a preload is applied to the lid 73 by a compression repulsive force of the seal member 79, thereby preventing chatter or rattle of the lid 73. If the lid 73 is opened, the second screws 77 are covered with the seal member 79, and the first screws 74 securing, to the instrument panel 60, the upper wall 71a of the lid mounting frame 71 fitted to the inner peripheral surface of the opening portion 70a of the glove box 70 are not easily seen from outside of the opening portion 70a of the glove box 70, thereby improving appearance.

A cover portion 73a that covers the positioning piece 76 and the hinge 72 is integrally formed in the lid 73. Thus, in the closed state of the lid 73, the positioning piece 76 and the hinge 72 are hidden by the cover portion 73a integral with the lid 73, thereby improving appearance.

Further, the lock means 80 that can lock the lid 73 in a closed position is provided in the lid 73. The lock means 80 is comprised of a rotary knob 81 axis-supported on an upper portion of the lid 73, and a lid lock pawl 82 provided on a back side of the lid 73 and pivoted between a lock position and an unlock position by the knob 81. The lid lock pawl 82 engages with a retaining portion 83 continuously connected to the upper wall 71a of the lid mounting frame 71 in the lock position and holds the lid 73 in the closed position.

Figure 11:
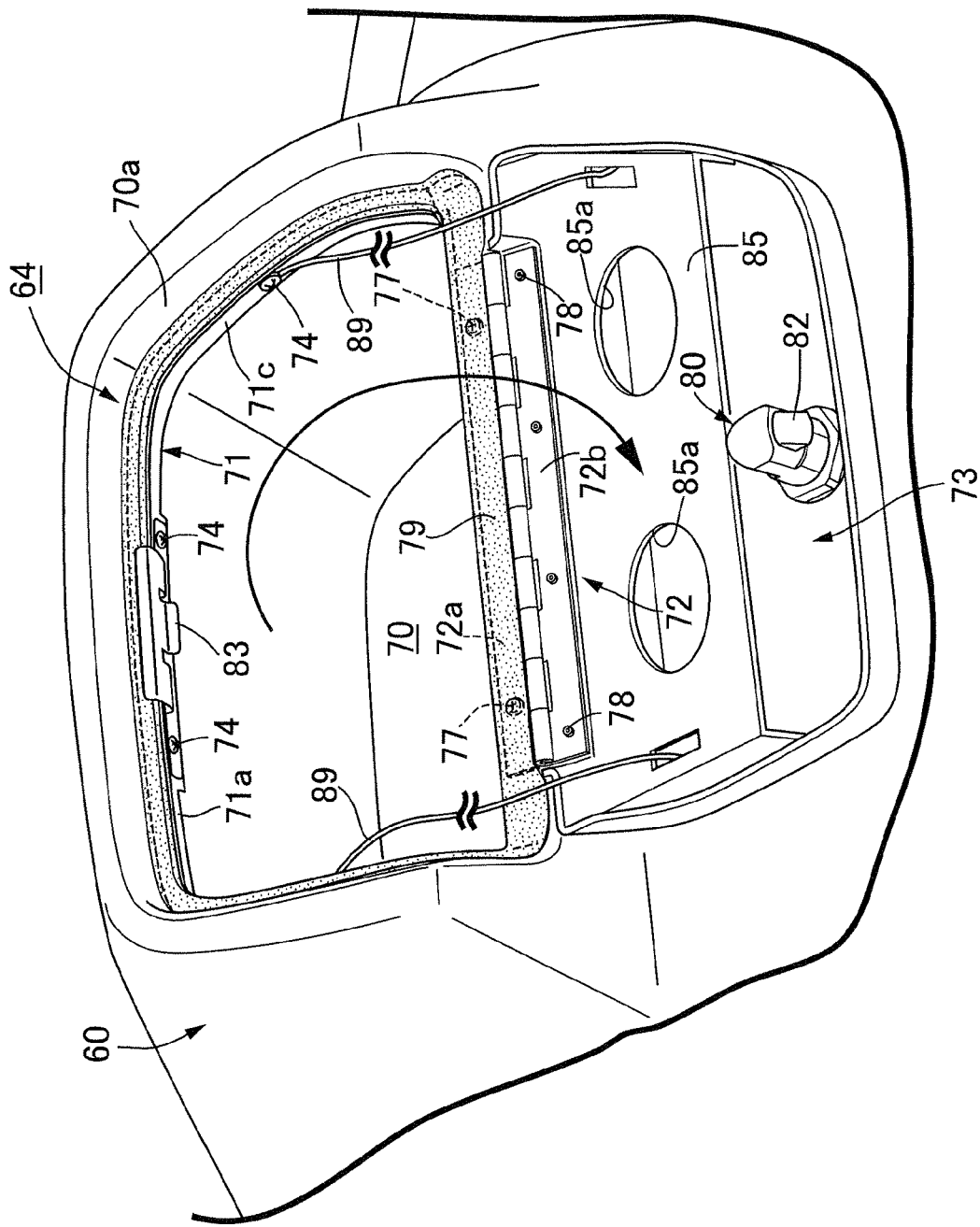
FIG. 11 is a perspective view showing an opened state of the glove box device.
Figure 12:
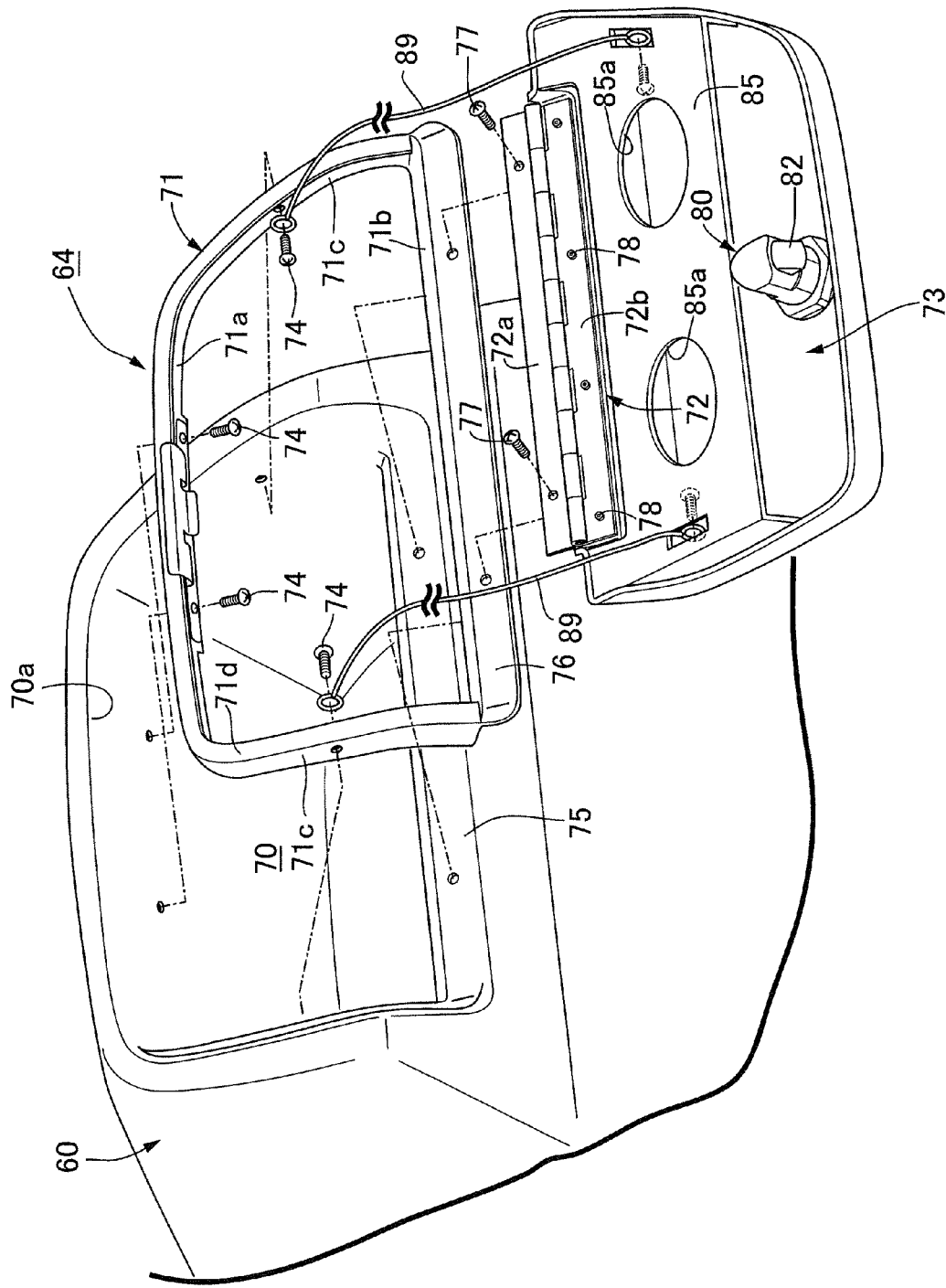
FIG. 12 is an exploded perspective view of the glove box device.

As shown in FIGS. 11 and 12, an auxiliary box 85 that can house documents or the like is provided on the back surface of the lid 73. The auxiliary box 85 has a cup holding hole 85a that can hold a drink cup or the like, and also serves as a cup holder with the lid 73 being used as a bottom wall when the lid 73 is horizontally opened. To restrict a horizontally opened position of the lid 73, opposite ends of stopper straps 89 are secured by screws between the left and right side walls 71c of the lid mounting frame 71 and the left and right sides of the lid 73. At this time, each stopper strap 89 is screwed to the side wall 71c by shared use of the first screw 74 for securing the side wall 71c to the instrument panel 60.

In assembling the glove box device 70, the lid mounting frame 71 is first fitted to the inner peripheral surface of the opening portion 70a of the glove box 70, and the positioning piece 76 of the lid 73 is caused to abut against the positioning wall 75 of the instrument panel 60. Thus, a mounting position of the lid mounting frame 71 in vertical, lateral and depth directions is precisely and easily determined. Then, the upper wall 71a of the lid 73 is secured to the instrument panel 60 by the first screws 74, and the first hinge arm 72a of the hinge 72 is placed over the positioning piece 76 and is secured to the positioning wall 75 by the second screws 77.

Then, the seal member 79 is bonded to the flange portion 71d of the lid mounting frame 71 and the positioning piece 76 to cover the second screws 77, and then the lid 73 is secured to the second hinge arm 72b of the hinge 72 by the third screws 78.

Thus, the lid mounting frame 71 is fitted to the inner peripheral surface of the opening portion 70a of the glove box 70, and is thus restricted in vertical and lateral movements by the inner peripheral surface of the opening portion 70a of the glove box 70. Therefore, the lid mounting frame 71 can be secured to the instrument panel 60 by a relatively small number of first and second screws 74 and 77.

The positioning piece 76 continuously connected to the lower wall 71b of the lid mounting frame 71 abuts against the positioning wall 75 of the instrument panel 60 to restrict the position of the depth direction of the lid mounting frame 71, and also supports the first hinge arm 72a of the hinge 72, thereby simplifying a structure. At this time, the first hinge arm 72a is secured to the instrument panel 60 by the shared second screws 77 so as to hold the positioning piece 76 narrowly between the first hinge arm 72a and the positioning wall 75. This eliminates the need for a special securing member for mounting the hinge 72 to the instrument panel 60, thereby further simplifying the structure.

Figure 13:
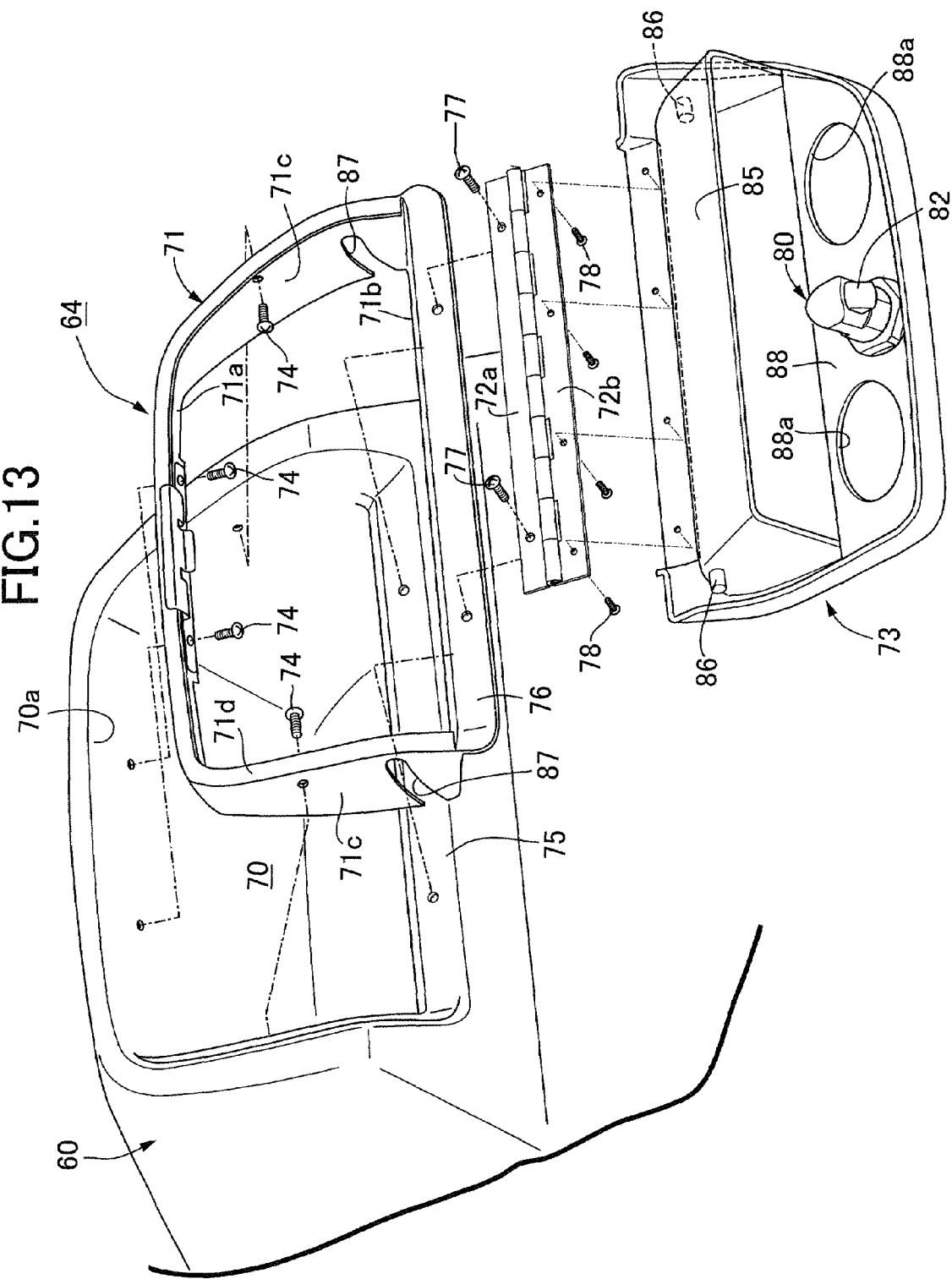
FIG. 13 is a view corresponding to FIG. 12 showing another embodiment of a glove box device.

FIG. 13 shows another embodiment of a glove box device 70. In this embodiment, an auxiliary box 85 that can house documents or the like and a cup holder 88 used in a horizontally opened state of a lid 73 are provided on a back surface of the lid 73. The cup holder 88 has a cup holding hole 88a that can hold a cup or the like. Also in this case, the lid 73 is also used as a bottom wall of the cup holder 88.

To restrict a horizontally opened position of the lid 73, stopper pins 86 are provided to protrude on left and right outer surfaces of the glove box 70, and arcuate guide grooves 87 with which the stopper pins 86 slidably engage are formed in the lid mounting frame 71. Thus, the stopper pins 86 abut against end walls of the guide grooves 87 to restrict the horizontally opened position of the lid 73.

Other configurations are the same as in the former embodiment, thus in FIG. 13, components corresponding to those in the former embodiment are denoted by the same reference numerals, and overlapping descriptions will be omitted.

As shown in FIGS. 14, and 25 to 27, to the left and right reinforcement stays 105, head rests 130 corresponding to the left and right seats 18a and 18b, and a console bag 131 placed in the intermediate portion between the left and right seats 18a and 18b are removably mounted. The console bag 131 includes a bag body 132 having an opened front surface opened long in a vertical direction, and a lid member 133 connected to a lower end of the front surface of the bag body 132 so as to be openable forward, and a fastener 134 for opening and closing the lid member 133 is provided between the bag body 132 and the lid member 133. The bag body 132 can house drink bottles 135 or the like, and the lid member 133 is connected to the bag body 132 by stopper belts 136 so as to hold a horizontal position in the opened state. Thus, the lid member 133 functions as a table in the opened state.

A plurality of belts 137 with hook and loop fasteners are sewn to a back surface of the bag body 132. The belts 137 are wound around the left and right reinforcement stays 105, and thus the console bag 131 is supported by the reinforcement stays 105. On an upper end surface of the bag body 132, a handle 138 is provided that can remove the console bag 131 from the reinforcement stays 105 and carry the console bag 131.

Figure 28:
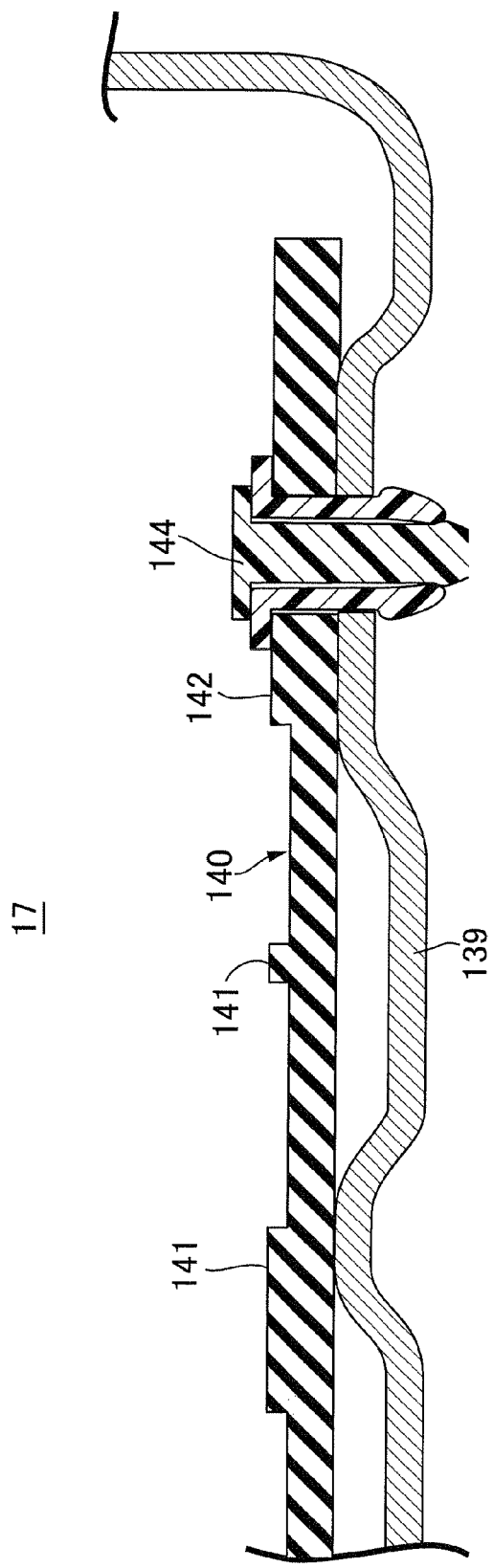
FIG. 28 is an enlarged sectional view taken along the line 28-28 in FIG. 9 showing a mounting structure of a floor mat in the cabin.
Figure 29:
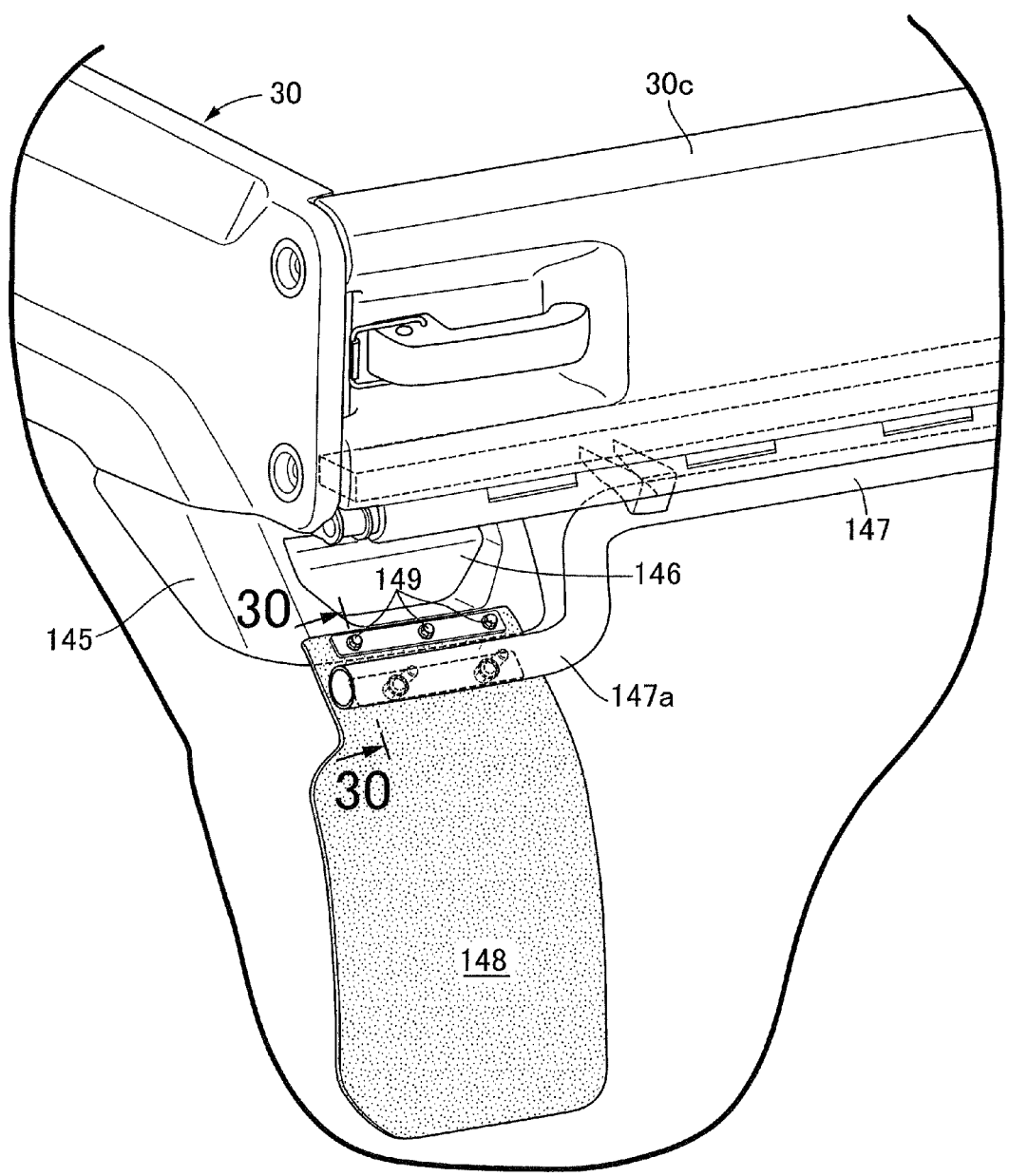
FIG. 29 is a rear perspective view of a mudguard plate for a rear wheel and its surroundings of the truck in FIG. 1.

Returning to FIG. 9, a floor mat 140 is placed on a floor 139 of the cabin 17. The floor mat 140 is made of rubber and formed into a shape corresponding to the shape of the floor 139, and a number of anti-slip protrusions 141 are formed on an upper surface of the floor mat 140. On an upper surface at a peripheral edge portion of the floor mat 140, anti-slip and reinforcement ribs 142 are formed, and drain notches 143 are provided in the ribs 142 at front, rear, left and right corners in the floor mat 140. Thus, even if the floor mat 140 is wet with rainwater or the like, drain from the notches 143 can facilitate drying of the floor mat 140. As shown in FIG. 28, the floor 139 is secured to the floor 139 by fastener members such as push turn rivets 144 or the like at a plurality of positions on the ribs 142.

In FIGS. 9 and 30, on the left and right of the rear portion of the vehicle body 11, rear fenders 145 are provided that are placed to be continuously connected to the rear portion of the loading platform 30 in the normal position and cover the rear wheels 15 on the respective sides. On a back surface of each rear fender 145, a stop lamp 146 that lights according to a brake operation of the truck 10 is mounted. To a rear end of the frame 11F of the vehicle body 11, a rear bumper 147 formed of a steel pipe is mounted. At left and right ends of the rear bumper 147, overhanging portions 147a overhanging behind the rear fenders 145 and below the stop lamps 146 are formed so as to protect the rear fenders 145 and the stop lamps 146 from rear obstacles.

To the rear end portion of each rear fender 145, an upper end portion of a mudguard plate 148 made of rubber and covering a rear surface of the rear wheel 15 is mounted by bolts 149 and nuts 150. An intermediate portion of the mudguard plate 148 is secured to a lower surface side of the overhanging portion 147a of the rear bumper 147 by bolts 151. Thus, the mudguard plate 148 having a front end supported by the rear fender 145 is supported at the intermediate portion by the overhanging portion 147a of the rear bumper 147 placed behind the rear fender 145, and is thus sufficiently displaced rearward of the rear wheel 15. This ensures a sufficient distance between the rear wheel 15 and the mudguard plate 148, and allows dispersed mud from the rear wheel 15 to be effectively received by the mudguard plate 148.

The present invention is not limited to the above described embodiments, and various design choices may be made without departing from the gist of the invention.

What is claimed is:

1. A protection screen placed between a cabin and a loading platform and mounted to a vehicle body to prevent items from moving from the loading platform toward the cabin in a vehicle in which the loading platform that is placed adjacent to a back surface of the cabin is joined at a rear portion thereof to the vehicle body via a pivot axis to be inclined from a horizontal normal position to a dump position where the loading platform is inclined in a forward direction of the vehicle, the protection screen comprising:
an upper screen having a width that is wider than that of a seat back of an occupant seat provided in the cabin;
a lower screen having a width that is narrower than that of the upper screen and is continuously connected to said upper screen; and
a bracket which connects the upper and lower screens to the cabin of the vehicle.

2. The protection screen according to claim 1, wherein the lower screen inclines forward to a lower portion along a sloping back surface of the seat back.

3. The protection screen according to claim 1, wherein at least a portion of the upper screen includes a mesh member, and at least a portion of the lower screen includes a plate member.

4. A vehicle comprising:
a cabin formed on a vehicle body;
a loading platform joined to the vehicle body via a pivot axis to be inclined from a horizontal normal position to a dump position where the loading platform is inclined upward on a side of the cabin; and
the protection screen according to any one of claims 1 to 3.

5. A vehicle comprising:
a vehicle body;
a cabin formed on the vehicle body;
a loading platform provided adjacent to one side of the cabin, and joined to the vehicle body via a pivot axis to be inclined from a horizontal normal position to a dump position where the loading platform is inclined upward on a side of the cabin; and
a protection screen that covers the one side of the cabin and is mounted to the vehicle body to prevent items from moving from the loading platform toward the cabin,
wherein a grip is provided at an upper end portion of the loading platform on the side of the cabin,
the protection screen includes an upper screen that covers the one side of the cabin of the loading platform over a substantially entire width thereof, and a lower screen continuously connected to a lower end of the upper screen, positioned to be inclined forward at a lower portion, and having a width narrower than that of the upper screen, and
a cut-out space that is provided between the upper and lower screens.

6. The vehicle according to claim 5, wherein the protection screen includes a screen frame having a width substantially the same as that of the loading platform, is placed above the loading platform, and is secured to the vehicle body, a mesh member attached to the screen frame, and a plate member secured to a lower portion of the screen frame (108a) and the vehicle body,
wherein a width of the plate member is smaller than that of the screen frame, and wherein the space is provided below left and right ends of the screen frame.

7. The vehicle according to claim 6, wherein the loading platform is placed adjacent to a back surface of the cabin, the screen frame is placed substantially immediately above a front wall of the loading platform, and the plate member is positioned to be inclined forward to a lower portion along a sloping back surface of a seat back of a seat provided in the cabin.

8. The vehicle according to claim 5, wherein the vehicle body includes pairs of left and right front pillars and rear pillars that surround the cabin,
the left and right rear pillars are joined to each other by a reinforcement stay, the upper screen is secured at an upper portion to the left and right rear pillars and secured at a lower middle portion to the reinforcement stay, and a lower end portion of the lower screen is secured to the reinforcement stay.

* * * * *